US012269834B2

United States Patent
Witker et al.

(10) Patent No.: US 12,269,834 B2
(45) Date of Patent: Apr. 8, 2025

(54) SELECTIVE PREPARATION OF VINYL- AND ETHYL-FUNCTIONALIZED CHLOROSILANES

(71) Applicant: DOW SILICONES CORPORATION, Midland, MI (US)

(72) Inventors: David Lawrence Witker, Midland, MI (US); Juan Mauricio Venegas, Midland, MI (US); Ronen Weingarten, Midland, MI (US); Dimitris E. Katsoulis, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 234 days.

(21) Appl. No.: 17/786,570

(22) PCT Filed: Dec. 17, 2020

(86) PCT No.: PCT/US2020/065615
§ 371 (c)(1),
(2) Date: Jun. 17, 2022

(87) PCT Pub. No.: WO2021/127182
PCT Pub. Date: Jun. 24, 2021

(65) Prior Publication Data
US 2023/0076525 A1    Mar. 9, 2023

Related U.S. Application Data

(60) Provisional application No. 63/059,909, filed on Jul. 31, 2020, provisional application No. 62/949,883, filed on Dec. 18, 2019.

(51) Int. Cl.
*C07F 7/14*    (2006.01)

(52) U.S. Cl.
CPC .................. *C07F 7/14* (2013.01)

(58) Field of Classification Search
CPC ............. C07F 7/122; C07F 7/14; C07F 7/20
See application file for complete search history.

(56) References Cited

U.S. PATENT DOCUMENTS

| 4,252,678 A | 2/1981 | Smith |
| 4,331,825 A | 5/1982 | Whyman |
| 4,668,812 A | 5/1987 | Quirk et al. |
| 4,927,953 A | 5/1990 | Takatsuna et al. |
| 6,291,622 B1 | 9/2001 | Drose et al. |
| 9,447,125 B2 | 9/2016 | Roy et al. |
| 2016/0102178 A1 | 4/2016 | Roy et al. |
| 2017/0260215 A1 | 9/2017 | Nagashima et al. |
| 2019/0329231 A1 | 10/2019 | Bousquie et al. |
| 2020/0353454 A1* | 11/2020 | Meille ............... B01J 35/40 |

FOREIGN PATENT DOCUMENTS

| CN | 1261074 A | 7/2000 |
| CN | 101787045 A | 7/2010 |
| FR | 3061183 A1 | 6/2018 |
| JP | S56122390 A | 9/1981 |
| JP | H035489 A | 1/1991 |
| JP | 2005075807 A | 3/2005 |
| JP | 2017088909 A | 5/2017 |
| WO | 2014056889 A1 | 4/2014 |
| WO | 2018190999 A1 | 10/2018 |
| WO | 2019138194 A1 | 7/2019 |

OTHER PUBLICATIONS

Nesmeyanov, A.N. et al., "Addition, Substitution, and Telomerization Reactions of Olefins in the Presence of Metal Carbonyls or Colloidal Iron", Tetrahedron, 1962, vol. 17, pp. 61 to 68.
International Search Report for PCT/US2020065612 dated Mar. 12, 2021, 7 pages.
International Search Report for PCT/US2020/065615 dated Mar. 12, 2021, 5 pages.
Ojima et al., "The Reactions of Hydrosilanes with Trifluoropropene and Pentafluorostyrene Catalyzed by Ruthenium, Rhodium and Palladium Complexes" Journal of Organometallic Chemistry, vol. 260, Issue 3 (1984), pp. 335-346.
Mager et al., "Synthesis of Water-Soluble Ruthenium Clusters by Reaction with PTA (1,3,5-triaza-7-phosphaadamantane)", Journal of Organometallic Chemistry, vol. 794 (2015), pp. 48-58.

(Continued)

*Primary Examiner* — Pancham Bakshi
(74) *Attorney, Agent, or Firm* — Warner Norcross + Judd LLP

(57) ABSTRACT

A method of preparing an organosilicon compound via selective silylation of ethylene is disclosed. The method comrises prises reacting via silylation (A) a hydridochlorosilane compound and (B) ethylene in the presence of (C) a catalyst, thereby preparing the organosilicon compound. The silylation may be selectively conducted as a dehydrogenative coupling to prepare the organosilicon ompound as a vinylchlorosilane compound, or as a hydrosilylation to prepare the organosilicon compound as an ethylchlorosilane compound. The catalyst (C) comprises a Ru(0) complex, and may be recycled for use in subsequent silylation reactions without purification. The organosilicon compound prepared according to the method is also disclosed.

18 Claims, No Drawings

(56) References Cited

OTHER PUBLICATIONS

Vogel et al., "Oxygen and Carbon Monoxide Interaction on Novel Clusters Like Ruthenium: A WAXS Study", Journal of Catalysis, vol. 232, Issue 2 (2005), pp. 395-401.

Fontal et al., "Catalytic Studies with Ruthenium Clusters Substituted with Diphosphines: Part I. Studies with Ru3(CO) 10(Ph2PCH2PPh2)", Journal of Molecular Catalysis A: Chemical, vol. 149, Issues 1-2 (1999), pp. 75-85.

Seki et al., "Single Operation Synthesis of Vinylsilanes From Alkenes and Hydrosilanes with the Aid of Ru3(CO)12", Am. Chem. Soc., J. Org. Chem. (1986), vol. 51, No. 20, pp. 3890-3895.

Lachaize et al., "Mechanistic Studies on Ethylene Silylation with Chlorosilanes Catalysed by Ruthenium Complexes", Chemical Communications 2 (2003), pp. 214-215.

Lachaize et al., "Supplementary Data Mechanistic Studies on Ethylene Silylation with Chlorosilanes Catalysed by Ruthenium Complexes", (2003) found at: http://www.rsc.org/suppdata/cc/b2/b210552g/b210552g.doc (accessed on Oct. 20, 2022), 2 pages.

Lachaize et al., "Silyl and σ-Silane Ruthenium Complexes: Chloride Substituent Effects on the Catalysed Silylation of Ethylene", Dalton Transactions vol. 39., No. 36 (2010), pp. 8492-8500.

Machine assisted English translation of JP2017088909A obtained from https://patents.google.com/patent on Oct. 21, 2022, 21 pages.

Alvarez-Rodriguez, et al. "Structural changes on RuCu/KL bimetallic catalysts as evidenced by n-hexane reforming." Catalysis Today 133 (2008) pp. 793-799.

Guczi, et al., "From Molecular Clusters to Metal Nanoparticles", Topics in Catalysis vol. 19, No. 2 (2002) pp. 157-163.

Lu et al., "Iridium-Catalyzed (Z)-Trialkylsilylation of Terminal Olefins", The Journal of Organic Chemistry 75.5 (2010) pp. 1701-1705.

Cheng et al., "Iridium-Catalyzed, Diastereoselective Dehydrogenative Silylation of Terminal Alkenes with (TMSO) ?2meSiH" Angewandte Chemie International Edition, 52(34), (2013) pp. 8984-8989.

Bokka et al., "Regio- And Stereoselective Dehydrogenative Silylation and Hydrosilylation of Vinylarenes Catalyzed by Ruthenium Alkylidenes." Organic letters 18.20 (2016) pp. 5324-5327.

Fernandez et al., "Synthesis and Reactions of Dihydrido(triethylsilyl)(1,5-cyclooctadiene)iridium(III) Complexes: Catalysts for Dehydrogenative Silylation of Alkenes", Organometallics, 5(7) (1986) pp. 1519-1520.

Oro et al., "Hydrosilylation of Alkenes by Iridium Complexes", Journal of Molecular Catalysis, vol. 37, Issues 2-3 (1986) pp. 151-156.

Marciniec et al., "Catalysis of Hydrosilylation Part XXV. Effect of Nickel(O) and Nickel(II) Complex Catalysts on Dehydrogenative Silylation, Hydrosilylation and Dimerization of Vinyltriethoxysilane", Journal of Organometallic Chemistry, vol. 484, Issues 1-2, (1994) pp. 147-151.

Marciniec et al., "Competitive Dehydrogenative Silylation and Hydrogenative Dimerization of Vinyltriethoxysilane Catalyzed by the [Ni(acac)2] + PPh3 System, Intermediate and Mechanistic Implications", Journal of Organometallic Chemistry, vol. 521, Issues 1-2, (1996) pp. 245-251.

Maciejewski et al., "Catalysis of Hydrosilylation: Part XXXIV. High Catalytic Efficiency of the Nickel Equivalent of Karstedt Catalyst" Journal of Organometallic Chemistry 597(1-2) (2000) pp. 175-181.

Maciejewski et al., "Intermediates in Nickel(0)-Phosphine Complex Catalyzed Dehydrogenative Silylation of Olefins", Inorganica Chimica Acta, vol. 359, Issue 9 (2006) pp. 2989-2997.

Takeuchi et al., "Cationic Rhodium Complex-Catalyzed Highly Selective Dehydrogenative Silylation of Styrene", Organometallics, 15, 8, (1996) 2098-2102.

Lin et al., "Wettability-Driven Palladium Catalysis for Enhanced Dehydrogenative Coupling of Organosilanes", ACS Catalysis, 7(3) (2017) pp. 1720-1727.

Wissing et al., "Tuning the Selectivity of AuPd Nanoalloys towards Selective Dehydrogenative Alkyne Silylation", Chemistry—A European Journal, vol. 25, Issue 23 (2019) pp. 5870-5874.

Saridakis et al., "Unique Reactivity of Dihydrosilanes under Catalysis by Supported Gold Nanoparticles: cis-1,2-Dehydrogenative Disilylation of Alkynes", ChemCatChem, vol. 10, Issue 5 (2018) pp. 980-983.

Titilas et al., "Tandem Si—Si and Si—H Activation of 1,1,2,2-Tetramethyldisilane by Gold Nanoparticles in Its Reaction with Alkynes: Synthesis of Substituted 1,4-Disila-2,5-cyclohexadienes", Organometallics 34, 8 (2015) pp. 1597-1600.

Machine assisted English translation of JP2005075807A obtained from <https://patents.google.com/patent> on Sep. 19, 2024, 7 pages.

Machine assisted English translation of CN101787045A obtained from https://patents.google.com/patent on Feb. 3, 2025, 7 pages.

Machine assisted English translation of JPS56122390A obtained from https://worldwide.espacenet.com/patent on Feb. 3, 2025, 7 pages.

\* cited by examiner

SELECTIVE PREPARATION OF VINYL- AND ETHYL-FUNCTIONALIZED CHLOROSILANES

CROSS REFERENCE TO RELATED APPLICATIONS

This application is the U.S. National Stage of International Application No. PCT/US2020/065615 filed on 07 Dec. 2020, which claims priority to and all advantages of U.S. Provisional Patent Application No. 62/949,883 filed on 18 Dec.2019, and U.S. Provisional Patent Application No. 63/059,909 filed on 31 Jul. 2020, the contents of which are incorporated herein by reference.

FIELD OF THE INVENTION

The present disclosure relates generally to methods of preparing organosilicon compounds and, more specifically, to a method of selectively preparing vinylchlorosilanes and ethylchlorosilanes via tunable silylation.

DESCRIPTION OF THE RELATED ART

Hydrosilylation reactions are generally known in the art and involve an addition reaction between silicon-bonded hydrogen and aliphatic unsaturation. Hydrosilylation reactions are utilized in various applications, such as for cross-linking components of curable compositions. Hydrosilylation reactions may also be utilized to prepare individual components or compounds, e.g. components for inclusion in such curable compositions. Typically, hydrosilylation reactions are carried out in the presence of a platinum metal-based catalyst due to its excellent catalytic activity and stability. While platinum metal is generally much more expensive than other metals with lesser catalytic activities, non-platinum catalysts suffer from instability when exposed to ambient conditions. In particular, non-platinum catalysts can be prone to undesirable side reactions with ambient oxygen and water, thereby limiting use and potential end applications thereof.

Like hydrosilylation reactions, dehydrogenative silylation reactions are also known in the art and similarly involve a reaction between a silicon-bonded hydrogen and aliphatic unsaturation. However, in dehydrogenative silylation, there is no addition reaction, and instead the aliphatic unsaturation is vinylically bonded to silicon, with hydrogen gas ($H_2$) generated as a byproduct. As such, dehydrogenative silylation reactions may be utilized to prepare unsaturated compounds (e.g. olefin functional compounds) which may further undergo additional functionalization and/or coupling reactions (e.g. via hydrosilylation).

Unfortunately, catalysts for dehydrogenative silylation reactions suffer many of the same drawbacks associated with hydrosilylation catalysts, such as sensitivity to oxygen, water, and even light. Moreover, while such drawbacks have been overcome with recent advances in hydrosilylation catalysis, many catalytic systems suitable for hydrosilylation reactions are not functional or practical for use in dehydrogenative silylation reactions. For example, many such catalysts exhibit selectivity favoring the addition reaction, especially for minimally substituted olefins, thus leading to unselective reactions with undesirable product mixtures and low yields. Additionally, many conventional dehydrogenative silylation conditions are not functional group tolerant, and are thus limited in application.

BRIEF SUMMARY

The present disclosure provides a method of preparing an organosilicon compound. The method includes reacting via silylation (A) a hydridochlorosilane compound and (B) ethylene in the presence of (C) a catalyst comprising a Ru(0) complex, thereby preparing the organosilicon compound. The hydridochlorosilane compound (A) may have the general formula $HSiCl_xR_{3-x}$, where subscript x is 1, 2, or 3, and each R is an independently selected unsubstituted hydrocarbyl group having from 1 to 18 carbon atoms. The silylation is selectively employed as a dehydrogenative coupling or a hydrosilylation reaction, and may be used to prepare the organosilicon compound as a vinylchlorosilane compound having the formula $(H_2CCH)SiCl_xR_{3-x}$ or an ethylchlorosilane compound having the formula $(CH_3CH_2)SiCl_xR_{3-x}$ where subscript x and R are as defined above.

DETAILED DESCRIPTION

A method of preparing an organosilicon compound (the "preparation method") is provided herein. As will be understood from the description herein, the preparation method comprises a controllable ethylene silylation to selectively prepare the organosilicon compound with one or more ethylene-derived vinyl or ethyl groups. The silylation is achieved by use of a conserved catalyst under tunable conditions, which selectively facilitates a dehydrogenative coupling or hydrosilylation reaction to give the organosilicon compound with the desired ethylene-derived functionality. The particular materials and conditions employed also allow for the catalyst to be recovered and recycled for use in subsequent silylation reactions without loss of activity or selectivity. Accordingly, the preparation method provides a unique platform for efficient preparation of functionalized organosilicon compounds.

As will be understood by those of skill in the art, the vinyl- or ethyl-functionality provided from the silylation, as well as other optional functionality compatible with the conditions of the preparation method, provide the organosilicon compound with numerous uses in myriad compositions and methods, including preparing curable compositions (e.g. such as those based on one or more silicones) and various components thereof. For example, when vinyl-functional, the organosilicon compound may be utilized to prepare and/or crosslink curable compositions, e.g. as a starting material, reagent, building block, functionalizing compound, etc. The organosilicon compound may be utilized for different purposes in similar compositions and materials when ethyl-functional, such as an end-blocking or capping agent, or for unique purposes such as the preparation of low molecular weight silicones with reduced methyl content.

The preparation method includes reacting (A) a hydridochlorosilane compound and (B) ethylene in the presence of (C) a catalyst comprising a Ru(0) complex. The hydridochlorosilane compound (A), ethylene (B), and the Ru(0) complex-containing catalyst (C) are described in turn below, along with additional components that may be utilized in the preparation method, which may be collectively referred to herein as the "components" of the preparation method (i.e., "component (A)", "component (B)", "component (C)", etc., respectively.) or, likewise, as "starting material(s)," "compound(s)," and/or "reagent(s)" (A), (B), and/or (C), etc.

As will be understood by those of skill in the art from the description herein, the preparation method prepares the organosilicon compound via silylation of components (A)

and (B), as catalyzed by the catalyst (C), i.e., via forming a silicon-bonded vinyl or ethyl group in place of the silicon-bonded hydrogen atom of the hydridochlorosilane compound (A) (the "reaction"). In this context, as used herein, the term "silylation" is to be understood to encompass both dehydrogenative and hydrosilylative coupling reactions, irrespective of any particular reaction mechanism. In typical embodiments, as described below, the components and conditions of the silylation reaction employed in the preparation method are conserved across both reaction types such that general reference to the reaction, components, conditions, etc. are to be understood as applicable to the preparation method as a whole. However, as the preparation method provides for selecting between the two silylation mechanisms introduced above, the term "dehydrogenative coupling" is used herein in reference to preparing the vinyl-functional organosilicon compound via dehydrogenative silylation of ethylene (B) with the hydridochlorosilane compound (A). Similarly, the term "hydrosilylation" is used herein in reference to preparing the ethyl-functional organosilicon compound via hydrosilylating ethylene (B) with the hydridochlorosilane compound (A).

As introduced above, component (A) is a hydridochlorosilane compound, i.e., an organosilicon compound having at least one silicon-bonded hydrogen atom (i.e., a Si—H group), and at least one silicon-bonded chlorine atom (i.e., a Si—Cl group). The hydridochlorosilane compound (A) is not otherwise particularly limited.

Typically, component (A) has the general formula $HSiCl_xR_{3-x}$, where subscript x is 1, 2, or 3, and each R is an independently selected hydrocarbyl group. In some embodiments, the hydridochlorosilane compound (A) is further defined as an organohydridochlorosilane, such that subscript x is 1 or 2 in the general formula above. For example, in some such embodiments, subscript x is 1, such that the hydridochlorosilane compound (A) is further defined as a diorganohydridochlorosilane having the formula $HSiClR_2$. In other such embodiments, subscript x is 2, such that the hydridochlorosilane compound (A) is further defined as an organohydridodichlorosilane having the formula $HSiCl_2R$. In alternative embodiments, the hydridochlorosilane compound (A) is trichlorosilane (i.e., has the formula $HSiCl_3$).

With regard to the formulas of above concerning organohydridochlorosilanes for use as component (A), each R is an independently selected hydrocarbyl group. Suitable hydrocarbyl groups may be substituted or unsubstituted. With regard to such hydrocarbyl groups, the term "substituted" describes hydrocarbon moieties where either one or more hydrogen atoms is replaced with atoms other than hydrogen (e.g. a halogen atom, such as chlorine, fluorine, bromine, etc.), a carbon atom within a chain of the hydrocarbon is replaced with an atom other than carbon (i.e., R may include one or more heteroatoms (oxygen, sulfur, nitrogen, etc.) within a carbon chain), or both. As such, it will be appreciated that R may comprise, or be, a hydrocarbon moiety having one or more substituents in and/or on (i.e., appended to and/or integral with) a carbon chain/backbone thereof, such that R may comprise, or be, an ether, an ester, etc.

In general, hydrocarbyl groups suitable for R may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, as well as branched saturated hydrocarbon groups, e.g. having from 6 to 18 carbon atoms. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, and cyclohexenyl groups. However, it will be appreciated that, in certain embodiments, such alkenyl groups may participate in the chemistry of the silylation reaction. As such, in certain embodiments, R is free from, alternatively substantially free from, alkene-containing functional groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups. Typically, each R is an independently selected substituted or unsubstituted hydrocarbyl group. For example, in some embodiments each R is independently selected from unsubstituted hydrocarbyl groups, such as linear or unbranched unsubstituted hydrocarbyl groups. In specific embodiments, each R is independently selected from unsubstituted hydrocarbyl groups having from 1 to 18 carbon atoms.

When subscript x is 1, such that the hydridochlorosilane compound (A) is further defined as the diorganohydridochlorosilane, each R may be the same as or different from the other R in the hydridochlorosilane compound (A). In certain embodiments, each R is the same as each other R in the hydridochlorosilane compound (A). In other embodiments, one R is different from the other R of the hydridochlorosilane compound (A). In some embodiments, each R is an independently selected hydrocarbyl group having from 1 to 18, alternatively from 1 to 12, alternatively from 1 to 6, carbon atoms. In certain embodiments, each R is independently selected from alkyl groups, such as methyl groups, ethyl groups, etc. In specific embodiments, each R is methyl. For example, in some such embodiments, the hydridochlorosilane compound (A) has the formula $HSiCl_x(CH_3)_{3-x}$, where subscript x is as defined above. In certain such embodiments, component (A) comprises dimethylchlorosilane (i.e., of formula $HSiCl(CH_3)_2$), methyldichlorosilane (i.e., of formula $HSiCl_2(CH_3)$), or combinations thereof.

Component (B) comprises, alternatively is ethylene. The ethylene is not limited, and may be used in neat form (i.e., free from, alternatively substantially free from other components/compounds). Said differently, component (B) may consist of, alternatively consist essentially of ethylene, or may comprise ethylene in combination with other components. For example, in some embodiments, the method includes introducing a reactor fluid comprising, alternatively consisting essentially of, alternatively consisting of, ethylene into a vessel or reactor comprising at least components (A) and (C). In such embodiments, the reactor fluid may comprise components other than the ethylene, such as a carrier vehicle, which, as will be understood by those of skill in the art, will typically be or comprise a substance that is inert under the reaction conditions utilized in the preparation method (i.e., will not react with the components (A), (B), or (C)). Examples of such carrier vehicles include inert gasses such as nitrogen (g) ($N_2$), helium (g) (He), argon (g) (Ar), and the like, as well as combinations thereof.). In certain embodiments, however, component (B) is utilized in neat form, and consists essentially of ethylene (i.e., and is substantially free from, alternatively free from, a carrier vehicle).

Ethylene may be utilized in gaseous form in or as component (B). As such, it will be appreciated that, in certain embodiments, the preparation method is carried out in a vessel containing an ethylene atmosphere, as described in further detail below.

The preparation method may utilize any amount of components (A) and (B) and, more specifically, may comprise the hydridochlorosilane compound (A) and the ethylene (B) in varying amounts or ratios contingent on desired properties of the reaction, particular organosilicon compound to be prepared, and/or characteristics of the starting materials employed. As will be understood by those of skill in the art, components (A) and (B) are each mono-functional with regard to the silylation reaction, such that the molar ratio (A):(B) and the stoichiometric ratio (A):(B) is the same. As such, a theoretical maximum reaction of components (A) and (B) is achieved at a molar ratio of 1:1 (A):(B) (i.e., a 1:1 stoichiometric ratio component (A) to component (B)). As such, the ethylene is typically utilized in a molar amount that is at least equivalent to the molar amount of component (A) utilized. For example, components (A) and (B) may be utilized in a molar ratio of 1:1 (A):(B). An excess (e.g. slight excess, moderate excess, or gross excess) of ethylene can also be utilized, as will be understood from the description below. In general, components (A) and (B) are utilized in a molar ratio of 1:1 (A):(B), such as from 1:1 to 1:100 (A):(B).

As introduced above, the silylation reaction of preparation method is tunable to select for dehydrogenative coupling or hydrosilylation, and thereby prepare the organosilicon compound with ethylene-derived vinyl functionality or ethyl functionality, respectively (i.e., the "reaction selectivity"). More specifically, the reaction selectivity is controllable via the ratio of reactable ethylene to hydridochlorosilane compound (A) in the reaction, i.e., the ratio between the amount of ethylene in solution (i.e., solubilized ethylene) to the amount (e.g. concentration) of the hydridochlorosilane compound (A) in solution. As will be understood by those of skill in the art, the concentration of ethylene in the liquid/reactive phase of the reaction can be determined via direct measurement (e.g. with analytical techniques such as Raman spectroscopy, gas chromatography (GC), etc.) or theoretical estimation (e.g. based on vapor-liquid equilibrium calculations), or any other technique known in the art.

In general, the preparation method comprises reacting components (A) and (B) in a stoichiometric ratio of at least 1:2 (A):(B) to prepare a vinyl-functional organosilicon compound via dehydrogenative coupling, or reacting components (A) and (B) in a stoichiometric ratio less than 1:2 (A):(B) to prepare an ethyl-functional organosilicon compound via hydrosilylation. Said differently, all components and other reaction parameters being the same, the silylation is tunable by altering the relative amount of ethylene available to react with the hydridochlorosilane compound (A), where dehydrogenative coupling is favored at a relative ratio (B):(A) of 2 or more (i.e., 2:1 (B):(A)), and hydrosilylation is favored at a relative ratio (B):(A) of less than 2 (i.e., <2:1 (B):(A))

For example, in some embodiments, the silylation is further defined as dehydrogenative coupling of the hydridochlorosilane compound (A) and the ethylene (B) such that the organosilicon compound is prepared as a vinylchlorosilane compound. In these embodiments, the dehydrogenative coupling is carried out at a stoichiometric ratio of hydridochlorosilane compound (A) to ethylene (B) of at least 1:2, alternatively at least 1:3 (A):(B). For example, in certain embodiments, the ethylene is utilized in an amount sufficient to provide a molar ratio of ethylene (B) to hydridochlorosilane compound (A) of from 2:1 to 100:1, such as from 2:1 to 50:1, alternatively from 2:1 to 25:1, alternatively from 2:1 to 20:1, alternatively from 2:1 to 15:1, alternatively from 2:1 to 10:1, alternatively from 2:1 to 6:1, alternatively from 3:1 to 6:1 (B):(A). It will be understood that ratios outside of these ranges may also be utilized.

Typically, the particular amounts of components (A) and (B) reacted via dehydrogenative coupling will be selected based on the desired organosilicon compound to be prepared and, optionally, a desired end use thereof. For example, in certain embodiments, the ratio of components (A) and (B) are selected to provide the dehydrogenative coupling reaction with a conversion of the hydridochlorosilane compound (A) to the vinylchlorosilane compound of at least 75%, such as a conversion of at least 80%, alternatively at least 85%, alternatively at least 90%, alternatively at least 95%, alternatively at least 98%. In some such embodiments, the dehydrogenative coupling reaction also comprises a yield of the organosilicon compound (e.g. the vinylchlorosilane compound) of at least 75%, such as a yield of at least 80, alternatively at least 85, alternatively at least 90, alternatively at least 95%.

In certain embodiments, the silylation is further defined as hydrosilylation of the hydridochlorosilane compound (A) and the ethylene (B) such that the organosilicon compound is prepared as an ethylchlorosilane compound. In these embodiments, the hydrosilylation is carried out at a stoichiometric ratio of hydridochlorosilane compound (A) to ethylene (B) of less than 1:2 (A):(B). For example, in certain embodiments, the ethylene is utilized in an amount sufficient to provide a molar ratio of ethylene (B) to hydridochlorosilane compound (A) of from 1:1 to less than 2:1 (B):(A), such as from greater than 1:1 to less than 2:1, alternatively from greater than 1:1 to 1.9:1 (B):(A). Higher or lower ratios may also be utilized, e.g. depending on the reaction components and parameters selected, a desired selectivity/yield of the reaction, etc.

Typically, the particular amounts of components (A) and (B) reacted via hydrosilylation will be selected based on the desired organosilicon compound to be prepared and, optionally, a desired end use thereof. In certain embodiments, the ratio of components (A) and (B) are selected to provide the hydrosilylation reaction with a conversion of the hydridochlorosilane compound (A) to the ethylchlorosilane compound of at least 75%, such as a conversion of at least 80%, alternatively at least 85%, alternatively at least 90%, alternatively at least 95%, alternatively at least 98%. In some such embodiments, the hydrosilylation reaction also comprises a yield of the organosilicon compound (e.g. the ethylchlorosilane compound) of at least 75%, such as a yield of at least 80, alternatively at least 85, alternatively at least 90, alternatively at least 95%.

Typically, the particular amounts of components (A) and (B) will be selected based on the desired organosilicon compound to be prepared an, optionally, a desired end use thereof. For example, in certain embodiments, the ratio of components (A) and (B) are selected to provide the dehydrogenative coupling reaction with a conversion of the hydridochlorosilane compound (A) to the vinylchlorosilane compound of at least 75%, such as a conversion of at least 80%, alternatively at least 85%, alternatively at least 90%, alternatively at least 95%, alternatively at least 98%. In some such embodiments, the dehydrogenative coupling reaction also comprises a yield of the organosilicon compound (e.g. the vinylchlorosilane compound) of at least 50%, such as a yield of at least 60, alternatively at least 65, alternatively at least 70, alternatively at least 75%.

As introduced above, component (C) is a catalyst and, more specifically, a catalyst comprising a Ru(0) complex, i.e., a complex comprising ruthenium (Ru) in a neutral oxidation state. The Ru(0) complex is not particularly limited, and may be any Ru(0) complex capable of catalyzing the silylation of ethylene with the hydridochlorosilane compound (A).

Examples of suitable Ru(0) complexes include $\{Ru(\eta^4\text{-}1,5\text{-COD})(q^6\text{-}1,3,5\text{-COT})\}$; $\{Ru(PPh_3)_3(CO_2)\}$; $\{Ru(\eta^4\text{-}1,5\text{-COD})(q^6\text{-triphenylene})\}$; $\{[Ru(\eta^4\text{-}1,5\text{-COD})]_2(q^{12}\text{-triphenylene})\}$; $\{Ru(\eta^4\text{-}1,5\text{-COD})(\eta^4\text{-}1,3\text{-COT})PR'_3\}$; $\{Ru(q^6\text{-}1,3,5\text{-COT})PR'_3\}$; $\{Ru(\eta^4\text{-}1,5\text{-COD})(PR'_3)_3\}$; $\{Ru(\eta^4\text{-}1,5\text{-COD})(tBuNC)_3\}$; $\{[Ru(\eta^4\text{-}1,5\text{-COD})]_3(\eta^{18}\text{-triphenylene})\}$; $[Ru_3(CO)_{10}(MeCN)_2]$; $Ru_3(CO)_{12}$; and the like, as well as derivatives, modifications, and combinations thereof. One of skill in the art will appreciate that ligands represented by COD and COT are cyclooctadiene and cyclooctatriene, respectively. Ligands represented by general formula $PR'_3$ are tertiary phosphorous compounds (e.g. phosphines, phosphites, etc.), where each R' is an independently selected substituted or unsubstituted aryl group, aralkyl group, or cycloalkyl group, or a corresponding alkoxy or aryloxy group thereof, as exemplified by those described herein.

In certain embodiments, the Ru(0) complex comprises a triruthenium complex or a derivative thereof. Examples of triruthenium complexes include $\{[Ru(bda)\text{-}(pic)_2(\mu\text{-O})]_2Ru(pic)_2(H_2O)_2\}^{2+}$; $\{[Ru_3(\mu\text{-H})(\mu\text{-}\eta^3\text{-dpa-C,N,N})(CO)_9]\}$; $\{(Ru(acac)_2)_3(\text{diquinoxaline}[^2,3\text{-a:}2',3'\text{-c}]\text{phenazine})\}$; $\{[Cp^*Ru(\mu\text{-H})]_3(\mu_3\text{-}\eta^2\text{-(II)-PhCCH})(\mu_3\text{-BH})\}$; $[Ru_3(dmbpy)_6(\mu\text{-HAT})]^{6+}$; $\{[Ru(\eta^4\text{-}1,5\text{-COD})]_3(\eta^{18}\text{-triphenylene})\}$; $[Ru_3(CO)_{10}(MeCN)_2]$; $Ru_3(CO)_{12}$; and the like, as well as derivatives, modifications, and combinations thereof. One of skill in the art will appreciate that ligands represented by bda, pic, dpa, acac, dmbpy, and HAT are 2,2-bipyridine-6,6-dicarboxylate, 2-picolylamine, dipicolylamine, acetylacetonate, 4,4'-dimethyl-2,2'-bipyridine, and 1,4,5,8,9,12-hexaazatriphenylene, or deprotonated forms thereof, respectively.

As will be appreciated from the exemplary complexes above, and the further description and examples below, the Ru(0) complex may comprise a phosphorous ligand. Examples of phosphorous ligands include phosphines, phosphites, phosphates, phosphine oxides, phosphoramidites, phosphinium salts, phosphinoamines, chlorophosphines, phosphinoimines, phosphorodiamidites, phosphinites, phosphonates, phosphonites, triaminophosphines, trisilylphosphines, and the like, as well as derivatives, modifications, and combinations thereof. One of skill in the art will appreciate that such ligands may be utilized in an ionic form (e.g. from protonation/deprotonation), which are encompassed by the examples above and illustrated in various embodiments herein. Specific examples of phosphorous ligands include phosphine, trimethylphosphine, triphenylphosphine, methyldiphenylphosphine, trifluorophosphine, trimethylphosphite, triphenylphosphite, tricyclohexylphosphine, dimethylphosphinomethane (dmpm), dimethylphosphinoethane (dmpe), diphenylphosphinomethane (dppm), diphenylphosphinoethane (dppe), S,S-chiraphos, ethane-1,2-diylbis[(2-methoxyphenyl)phenylphosphane] (DIPAMP), 1,1'-bis(diphenylphosphino)ferrocene (dppf), tri(orthotolyl)phosphine, (2,4,6-triisopropylphenyl)dicyclopentylphosphine, and the like, as well as derivatives, modifications, and combinations thereof. One of skill in the art will appreciate that such phosphorous ligands include the phosphite versions of the phosphines above, as well as homosubstituted and heterosubstituted phosphines and phosphites having any one or more of the phosphorous bonded groups exemplified herein.

In specific embodiments, the Ru(0) complex of the catalyst (C) comprises a phosphorous ligand having the general formula $R^1_3P$, where each $R^1$ is an independently selected hydrocarbon group. Examples of suitable hydrocarbon groups include the hydrocarbyl groups set forth with respect to R above. As will be appreciated by those of skill in the art, each $R^1$ may be independently selected based on a factor such as steric hindrance, electronics (e.g. electron donative, inductive, or withdrawing effects), and the like, or combinations thereof. Each $R^1$ may be selected to impart chirality or to impart symmetry to the catalyst. In these or other embodiments, $R^1$ may be independently selected to enforce reactive regioselectivity, such as anti-Markovnikov selectivity (e.g. such as when the ethylene is substituted). In certain embodiments, each $R^1$ is independently a branched or cyclic group. For example, each $R^1$ may be independently selected from isopropyl, isobutyl, t-butyl, other branched alkyl, aryl, alkaryl, aralkyl, substituted aryl (e.g. pentafluorophenyl, etc.) and the like. In specific embodiments, each $R^1$ in the phosphorous ligand is the same. In some embodiments, the phosphorous ligand has the formula $R^1_2PR^2$, where $R^1$ is as defined above and $R^2$ is $R^1$ or phosphorous-containing (i.e., substituted) hydrocarbyl group such that the phosphorous ligand is a polydentate ligand having more than one phosphorous atom. Specific examples of such phosphorous ligands include 1,3-bis(dicyclohexylphosphino)propane and 1,3-bis(diphenylphosphino)propane. In particular embodiments, the phosphorous ligand is further defined as an organophosphine ligand. In some such embodiments, each $R^1$ is an independently selected substituted or unsubstituted aryl group, aralkyl group, or cycloalkyl group, and $R^2$ is $R^1$ or an alkaryl group. Examples of such organophosphine ligands include substituted and unsubstituted triarylphosphines, tricycloalkylphosphine,s bis(diarylphosphino)alkanes, bis(dicycloalkylphosphino)alkanes, and combinations thereof.

In specific embodiments, the Ru(0) complex of the catalyst (C) comprises an organophosphite ligand, such as those having formula $(R^1O)_2P(OR^2)$, where $R^1$ and $R^2$ are as defined above. In some embodiments, each $R^1$ and $R^2$ comprises a substituted or unsubstituted aryl group, such that the organophosphite ligand is further defined as a triarylphosphite ligand.

Additional examples of suitable phosphorous ligands include those having an intermediate Tolman Electronic Parameter (TEP) and/or an intermediate Tolman Cone Angle (TCA). For example, in some embodiments, the Ru(0)

complex of the catalyst (C) comprises a phosphorous ligand having a TEP of from 2,050 to 2,100 cm$^{-1}$, such as from 2,060 to 2,090, alternatively from 2,065 to 2,085 cm$^{-1}$. In these or other embodiments, the Ru(0) complex comprises a phosphorous ligand having a TCA of from 100 to 200°, such as from 115 to 185°, alternatively from 130 to 170°. As will be understood by those of skill in the art, the TEP of a phosphorous ligand is based on the $A_1$-symmetrical CO stretching frequency (w) of a standard nickel tricarbonyl complex including the ligand (i.e., of formula (R'$_3$P) Ni(CO)$_3$, where ligand PR'$_3$ is the phosphorous ligand, and is as defined above), and may be determined from measuring the vibrational spectra (i.e., infrared (IR) or Raman) of the complex according to the relationship: TEP=w(CO, Ni; $A_1$)=2056.1 +pL, where pL is the ligand-specific increment to the CO stretching frequency (w). Typically, P(tBu)$_3$ is utilized as a reference, with pL(P(tBu)$_3$) set to 0 such that $\omega$(CO,A1) =2056.1 cm$^{-1}$. As will also be understood by those of skill in the art, the TCA of a phosphorous ligand in a transition metal complex is the solid angle formed with the metal at a vertex and outermost edge/perimeter of a cone minimally sized about the van der Waals spheres of the ligand atoms, and may be determined using computational space-filling models and/or empirical bond characterization. Methods and materials for such determinations of TEP and/or TCA are set forth in greater detail in Tolman, Chemical Reviews, 1977, vol 77 (3) pp 313-348, the characterization methods and phosphorous ligands of which are hereby incorporated by reference herein.

The particular phosphorous ligand utilized in the Ru(0) complex of the catalyst (C) may be selected based on the particular hydridochlorosilane compound (A) utilized and/or the particular organosilicon compound to be prepared. For example, in certain embodiments, the components/parameters of the reaction are selected to prepare the vinyl-functional organosilicon compound (e.g. via dehydrogenative coupling of components (A) and (B), the hydridochlorosilane compound (A) is an organohydridochlorosilane, and the Ru(0) complex of the catalyst (C) comprises the phosphorous ligand. In some such embodiments, the hydridochlorosilane compound (A) is the diorganohydridochlorosilane having the formula HSiClR$_2$, and the Ru(0) complex of the catalyst (C) comprises the organophosphine ligand. In other such embodiments, the hydridochlorosilane compound (A) is the organohydridodichlorosilane having the formula HSiCl$_2$R, and the Ru(0) complex of the catalyst (C) comprises the organophosphite ligand.

In particular embodiments, the Ru(0) complex comprises, alternatively is, triruthenium dodecacarbonyl (i.e., of formula Ru$_3$(CO)$_{12}$) or a derivative thereof. In some such embodiments, the triruthenium dodecacarbonyl derivatives are further defined as ligand-exchanged derivatives of triruthenium dodecacarbonyl having one or more phosphorous ligands. In specific embodiments, the one or more phosphorous ligands are selected from phosphines and phosphites, such as any of those described herein. It is to be appreciated that such ligand-exchanged derivatives may also be prepared from ruthenium compounds/complexes other than triruthenium dodecacarbonyl, and are encompassed by the scope of the Ru(0) complex herein regardless if prepared or otherwise obtained from triruthenium dodecacarbonyl or another ruthenium compound/complex.

The Ru(0) complex may comprise other ligands aside from those set forth above, such as those comprising and/or derived from amines, ketones, diones, olefins, nitriles, carbenes, and the like, as well as combinations thereof. Additional ligands may be prepared in situ (i.e., during the preparation method), such as via solvent exchange and/or normal catalytic operation of the Ru(0) complex in the presence of components (A) and (B), as will be appreciated from the description further below relating to the catalyst residue and the isolation/recycling/reuse of the same.

The Ru(0) complex of the catalyst (C) may be utilized in any form, such as neat (i.e., absent solvents, carrier vehicles, diluents, etc.), or disposed in a carrier vehicle, such as a solvent or dispersant (e.g. such as any of those listed and/or described herein), which will be independently selected by those of skill in the art (e.g. in view of the particular component (A) selected, the solubility of the Ru(0) complex, etc.). As such, the catalyst (C) may consist of, alternatively consist essentially of the Ru(0) complex or, alternatively, may comprise additional components such as a carrier vehicle, diluent, etc.

The catalyst (C) may be utilized in any amount, which will be selected by one of skill in the art, for example based on the particular catalyst (C) selected (e.g. the concentration/amount of active Ru species thereof), the nature/type of component (A) selected, the reaction parameters employed, the scale of the reaction (e.g. total amounts of component (A) utilized, etc.), etc. The molar ratio of the catalyst (C) to components (A) and/or (B) utilized in the reaction may influence the rate and/or amount of silylation to prepare the organosilicon compound. Thus, the amount of the catalyst (C) as compared to components (A) and/or (B), as well as the molar ratios therebetween, may vary. Typically, these relative amounts and the molar ratio are selected to maximize the reaction of components (A) and (B) while minimizing the loading of the catalyst (C) (e.g. for increased economic efficiency of the reaction, increased ease of purification of the reaction product formed, etc.).

In certain embodiments, the catalyst (C) is utilized in an amount of from 0.000001 to 50 wt. %, based on the total amount of component (A) utilized (i.e., wt./wt.). For example, the catalyst (C) may be used in an amount of from 0.000001 to 25, alternatively from 0.00001 to 10, alternatively from 0.0001 to 5 wt. % based on the total amount of component (A) utilized. In some embodiments, the catalyst (C) is utilized in an amount sufficient to provide a ratio of Ru(0) complex to hydridochlorosilane compound (A) of from 1:10 to 1:1,000,000, alternatively from 1:50 to 1:1,000 alternatively from 1:100 to 1:500 (C):(A). Such ratios may be a weight ratio (i.e., wt./wt. (C):(A), alternatively the active components thereof) or a molar ratio (C):(A), alternatively the active components thereof. It will be appreciated that amounts and ratios outside of the ranges listed above may be utilized as well. For example, the catalyst (C) may be utilized in a stoichiometric amount (i.e., a supracatalytic amount), e.g. based on the total amount of component (B) (i.e., the ethylene thereof) utilized in the preparation method.

It will be appreciated that the catalyst (C) may comprise a combination of different Ru(0) complexes, such as 2, 3, 4, 5 or more Ru(0) complexes which may be the same as or different from any other Ru(0) complex of the catalyst (C) (e.g. in terms of ligand identity, geometry, ruthenium content, etc.).

The catalyst (C) and/or the Ru(0) complex thereof may be prepared or otherwise obtained (i.e., as a prepared compound). Methods of preparing many of the exemplary Ru(0) complexes above are known in the art, using compounds that are commercially available from various suppliers. The catalyst (C) may thus be prepared prior to the reaction of components (A) and (B), or in situ (i.e., during the reaction of components (A) and (B), e.g. via combining components of the catalyst (C) with components (A) and/or (B)).

In certain embodiments, the catalyst (C) is prepared as part of the preparation method, i.e., the preparation method includes preparing the catalyst (C). Preparing the catalyst (C) may comprise preparing the Ru(0) complex, or providing the Ru(0) complex in a form suitable for use in catalyzing the silylation of components (A) and (B).

In particular embodiments, the preparation method comprises preparing the Ru(0) complex to give the catalyst (C). In such embodiments, preparing the Ru(0) complex typically comprises combining a catalyst precursor compound and a ligand precursor compound, optionally in the presence of a carrier vehicle, to give the Ru(0) complex (e.g. via ligand exchange), which may be used directly in the reaction of components (A) and (B) (e.g. used directly as the catalyst (C)) or, alternatively, may be purified, processed, combined with a carrier vehicle, or otherwise modified to prepare the catalyst (C). It will be appreciated however, that preparing the Ru(0) complex may comprise any number of additional steps/processes/procedures not set forth in additional detail below, such as oxidizing or reducing a ruthenium complex/compound having a different oxidation state to give a Ru(0) complex.

Examples of catalyst precursor compounds generally include Ru(0) complexes and triruthenium complexes, including those described above, as well as derivatives, modifications, and combinations thereof. For example, in certain embodiments the catalyst precursor compound is triruthenium dodecacarbonyl. Examples of ligand precursor compounds include the phosphorous ligands described above, including protonated and/or salt forms thereof. For example, in certain embodiments the ligand precursor compound is a tertiary phosphorous compound. In some such embodiments, the tertiary phosphorous compound is an organophosphine compound having formula $R^1_2PR^2$, where $R^1$ and $R^2$ are as defined above. In other such embodiments, the tertiary phosphorous compound is an organophosphite compound having formula $(R^1O)_2P(OR^2)$, where $R^1$ and $R^2$ are as defined above.

The catalyst and ligand precursor compounds may be provided, prepared, or otherwise obtained (e.g. from commercial sources). In certain embodiments, preparing the catalyst (C) further comprises preparing the catalyst and/or ligand precursor compounds prior to and/or in conjunction with complexing ruthenium of the catalyst precursor compound with the ligand precursor compound to give the Ru(0) complex. As understood in the art, the catalyst and ligand precursor compounds can be prepared or synthesized via numerous paths or techniques.

As introduced above, the Ru(0) complex may be prepared in a carrier vehicle, such as any of those described herein. For example, the Ru(0) complex may be prepared in a vehicle in which the catalyst (C) is disposed during use thereof. In certain embodiments, the Ru(0) complex is prepared in the presence of an aromatic solvent (e.g. an aromatic organic solvent), such as benzene, toluene, xylene (e.g. o-, m-, and/or p-xylene), mesitylene (i.e., 1,3,5-trimethyl benzene), and the like, or combinations thereof. Depending on various selections, when the catalyst (C) is prepared and/or disposed in the vehicle or solvent, the vehicle or solvent, or a moiety thereof, may complex with the Ru(0), e.g. to become a ligand or other component of the Ru(0) complex.

In specific embodiments, preparing the catalyst (C) comprises combining the catalyst and ligand precursor compounds in the presence of the aromatic solvent, thereby preparing the Ru(0) complex in the aromatic solvent. Typically, the catalyst and ligand precursor compounds and the aromatic solvent are combined in a vessel or reactor to prepare the Ru(0) complex and/or the catalyst (C). The vessel or reactor may be heated or cooled in any suitable manner, e.g. via a jacket, mantle, exchanger, bath, coils, etc. For example, in some embodiments, the catalyst and ligand precursor compounds are combined in the aromatic solvent at an elevated temperature to give the Ru(0) complex, and thus prepare the catalyst (C). The elevated temperature for preparing the catalyst (C) will be selected and controlled depending on the particular catalyst and/or ligand precursor compounds selected, the particular aromatic solvent and/or other carrier vehicle(s) utilized, the reaction vessel selected (e.g. whether open to ambient pressure, sealed, under reduced pressure, etc.), etc. Accordingly, the elevated temperature for preparing the catalyst (C) will be selected by one of skill in the art in view of the reaction conditions and parameters selected and the description herein. The elevated temperature for preparing the catalyst (C) is typically from greater than ambient temperature to 300° C., such as from 50 to 250, alternatively from 60 to 200, alternatively from 70 to 175, alternatively from 75 to 150, alternatively from 80 to 125° C. Elevated temperatures outside these ranges may also be utilized.

In certain embodiments, the preparation method includes reacting components (A) and (B) in the presence of (D) an olefin compound. As will be appreciated by those of skill in the art, the olefin compound (D) is typically employed in embodiments where the components/parameters of the reaction are selected to prepare the vinyl-functional organosilicon compound (e.g. via dehydrogenative coupling of components (A) and (B)). The olefin compound (D) comprises an unsaturated aliphatic hydrocarbon group, which may also be referred to as aliphatic unsaturation, ethylenic unsaturation, etc., depending on the particular form of the hydrocarbon group having the unsaturation (e.g. the C—C double and/or triple bond), and is not otherwise particularly limited.

In general, the olefin compound (D) includes, per molecule, at least one aliphatically unsaturated group. However, in certain embodiments, the olefin compound (D) includes an average of at least two aliphatically unsaturated groups per molecule. Of course, the olefin compound (D) may comprise any number of additional aliphatically unsaturated groups as well. Each aliphatically unsaturated group of the olefin compound (D) may be terminal, pendent, or in both such locations in the olefin compound (D), e.g. depending on the structure thereof.

In certain embodiments, the olefin compound (D) comprises, alternatively is, an organic compound. In other embodiments, the olefin compound (D) comprises, alternatively is, a siloxane. In yet other embodiments, the olefin compound (D) comprises, alternatively is, a silicone-organic hybrid, or an organosilicon compound. Various embodiments and examples of the olefin compound (D) are disclosed further below.

The aliphatically unsaturated group of the olefin compound (D) may be an alkenyl group and/or an alkynyl group. As will be understood by those of skill in the art, the term "alkenyl group" refers to a group having one or more carbon-carbon double bonds (e.g. an alkene), and the term "alkynyl group" refers to a group having one or more carbon-carbon triple bonds (e.g. an alkyne). Either of such groups may be cyclic or acyclic, branched or unbranched, substituted or unsubstituted, and combinations thereof. Such groups are not generally limited in terms of size and/or overall structure aside from the olefinic portion and, for example, may comprise from 2 to 30 carbon atoms, such as from 2 to 24 carbon atoms, alternatively from 2 to 20, alternatively from 2 to 12, alternatively from 2 to 10, alternatively from 2 to 6 carbon atoms. Particular alkenyl groups are exemplified by vinyl, vinylidine, allyl, propenyl, and hexenyl groups. Suitable alkenyl groups include internal, external, terminal (e.g. alpha-olefins), polysubstituted (e.g. cis and trans disubstituted, trisubstituted, and tetrasubstituted alkenes), and combinations thereof. Examples of particular alkynyl groups include ethynyl, propynyl, and butynyl groups.

Examples of compounds suitable for use as the olefin compound (D) include of alkenyl compounds (e.g. compounds having at least one alkenyl group), such as butenes (e.g. isobutene, cyclobutene, etc.), pentenes (e.g. 4-methyl-1-pentene, 3-methyl-1-pentene, cyclopentene, 2-methylcyclopentene, 4-methylcyclopentene, etc.), hexenes (e.g. cyclohexene, 3,5,5-trimethyl-1-hexene, vinylcyclohexene, etc.), linear alpha-olefins (e.g. 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, etc.), cyclic olefins (e.g. cycloheptene, cyclooctene, cyclononene, cyclodecene, norbornene, 4-methylnorbornene, dicyclopentadiene, 5-ethylidene-2-norbornene, 5-vinyl-2-norbornene, vinylnorbornane, etc.) polyolefins (e.g. 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, 1,5-diallylcyclooctane, 1,3-divinylcyclopentane, dicyclopentadiene, norbornadiene, etc.), branched acyclic olefins (e.g. 5-methyl-1-nonene), olefin-substituted cyclic compounds (e.g. vinylcyclohexane, etc.), linear and cyclic alkyne compounds, diene compounds (e.g. 1,4-pentadiene, 1,5-hexadiene, 1,6-heptadiene, 1,7-octadiene, 1,8-nonadiene, 1,9-decadiene, 1,11-dodecadiene, 1,13-tetradecadiene, 1,19-eicosadiene, etc.), diyne and ene-yne compounds (e.g. 1,3-butadiyne, 1,5-hexadiyne, 1-hexene-5-yne, etc.), and the like, as well as derivatives, modifications, and combinations thereof. The particular aliphatically unsaturated group and/or compound utilized in or as the olefin compound (D) will typically be selected based on hydrogenation and/or silylation rates. For example, in certain embodiments, the olefin compound (D) is selected to readily undergo hydrogenation, but undergo hydrosilylation slowly. In certain embodiments, the olefin compound (D) comprises, alternatively consists essentially of, alternatively is, norbornene or a derivative or analog thereof.

The preparation method may utilize any amount of component (D) and, more specifically, may comprise the olefin compound thereof in any amount and/or ratio contingent on desired properties of the reaction (e.g. conversion rates, etc.) and/or characteristics of the starting materials employed. Typically, component (D) is utilized in an amount sufficient to provide the olefin compound in at least a 1:1 stoichiometric ratio based on the number of silicon-bonded hydrogen groups of component (A) to be vinylated (i.e., the number of Si—H groups capable of undergoing the dehydrogenative coupling reaction). As such, the amount of component (D) is typically selected based on the amount and type of the hydridochlorosilane compound (A), as will be understood by those of skill in the art. An excess, or gross excess, of component (D) may be utilized. For example, components (A) and (D) may be utilized in a stoichiometric ratio of 1:1 (A):(D), such as a ratio of from 1:1 to 1:100 (A):(D). In certain embodiments, component (D) is utilized in an amount sufficient to provide a molar ratio of the olefin compound to the hydridochlorosilane compound (A) of from 1:1 to 100:1 (D):(A), such as from 1:1 to 10:1, alternatively from 2:1 to 10:1, alternatively from 3:1 to 5:1 (D):(A). Higher or lower ratios may also be utilized.

The components utilized in the preparation method (i.e., the hydridochlorosilane compound (A), ethylene (B), the catalyst (C), and/or the olefin compound (D) (when utilized)) may be provided "as is", i.e., ready for the reaction to prepare the organosilicon compound. Alternatively, any one or more, or all, of components (A), (B), (C), and or (D) may be formed prior to or during the reaction (e.g. such as where the method comprises preparing catalyst (C), as described above). In some embodiments, the preparation method further comprises preparing the hydridochlorosilane compound (A). In these or other embodiments, the preparation method further comprises preparing the ethylene (B). In these or other embodiments, the preparation method further comprises preparing catalyst (C). In these or other embodiments, the preparation method further comprises preparing the olefin compound (D).

Typically, components (A), (B), (C), and optionally (D), are reacted in a vessel or reactor to prepare the organosilicon compound. When the reaction is carried out at an elevated or reduced temperature as described below, the vessel or reactor may be heated or cooled in any suitable manner, e.g. via a jacket, mantle, exchanger, bath, coils, etc.

Components (A), (B), (C), and optionally (D), may be fed together or separately to the vessel, or may be disposed in the vessel in any order of addition, and in any combination. For example, in certain embodiments, components (A), (B), and (D) are added to a vessel containing component (C), e.g. as a premade catalyst or as individual components to form the catalyst (C) in situ. In particular embodiments, the catalyst (C) is prepared in the vessel, which is then charged with component (A), and optionally (D), to prepare a solution in the vessel, which is then pressurized with component (B). In some embodiments, components (A) and (D) may be first combined prior to being added to the vessel, or may be added to the vessel sequentially (e.g. (A) then (D)). In general, reference to the "reaction mixture" herein refers generally to a mixture comprising components (A), (B), (C), and optionally (D) if utilized, (e.g. as obtained by combining such components, as described above).

The method may further comprise agitating the reaction mixture. The agitating may enhance mixing and contacting together components (A), (B), (C), and optionally (D), when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., silylation) of the hydridochlorosilane compound (A) and the ethylene (B) to form the organosilicon compound. Other conditions may be result-effective conditions for enhancing reaction yield or minimizing amount of a particular reaction by-product included within the reaction product along with the organosilicon compound.

The components (A) and (B) may be reacted in the presence of carrier vehicle (e.g. a solvent, diluent, fluid, or combinations thereof), such that the reaction is carried out in a solution, emulsion, suspension, slurry, biphasic mixture, or combinations thereof. The particular solvents, carriers, and/or diluents utilized, and the respective amounts thereof employed, will be independently selected by one of skill in the art, e.g. based the particular hydridochlorosilane compound (A), catalyst (C), and/or olefin compound (D) (when utilized), the particular organosilicon compound to be prepared, etc. Typically, the reaction is carried out under homogeneous conditions (e.g. in a solution state). However, the reaction may be conducted heterogeneously, e.g. with one or more components suspended, but not dissolved, in the carrier vehicle. Typically, the ethylene (B) is utilized in the gaseous state, e.g. at a pressure selected to prepare the reaction mixture with a desired molar ratio (A):(B) and thus give the desired reaction chemistry. The other components, however, may be employed as homogeneous mixtures/solutions (i.e., dissolved and/or disposed in a carrier vehicle prior to forming the reaction mixture therewith).

In certain embodiments, the reaction is carried out in the presence of the carrier vehicle. The carrier vehicle is not particularly limited, and is typically selected for based on the particular hydridochlorosilane compound (A), catalyst (C), and/or olefin compound (D) (when utilized) selected, as well as the particular organosilicon compound to be prepared. For example, in such embodiments, the carrier vehicle typically comprises, alternatively is, an oil (e.g. an organic oil and/or a silicone oil), a fluid, a solvent, etc., or a combination thereof.

In some embodiments, the carrier vehicle comprises, alternatively is, an organic solvent. Examples of the organic solvent include those comprising an aromatic hydrocarbon, such as benzene, toluene, and xylene; an aliphatic hydrocarbon, such as heptane, hexane, and octane; a halogenated hydrocarbon, such as dichloromethane, 1,1,1-trichloroethane and methylene chloride; chloroform; dimethyl sulfoxide; dimethyl formamide, acetonitrile; tetrahydrofuran; white spirits; mineral spirits; naphtha; n-methylpyrrolidone; and the like, as well as derivatives, modifications, and combination thereof.

In some embodiments, the carrier vehicle comprises, alternatively is, a silicone fluid. The silicone fluid is typically a low viscosity and/or volatile siloxane. In some embodiments, the silicone fluid is a low viscosity organopolysiloxane, a volatile methyl siloxane, a volatile ethyl siloxane, a volatile methyl ethyl siloxane, or the like, or combinations thereof. Typically, the silicone fluid has a viscosity at 25° C. in the range of 1 to 1,000 mm$^2$/sec. Specific examples of suitable silicone fluids include hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, hexamethyldisiloxane, heptamethyloctyltrisiloxane, hexyltrimethicone, and the like, as well as derivatives, modifications, and combinations thereof. Additional examples of suitable silicone fluids include polyorganosiloxanes with suitable vapor pressures, such as from $5 \times 10^{-7}$ to $1.5 \times 10^{-6}$ m$^2$/s.

In certain embodiments, the carrier vehicle comprises, alternatively is, an organic fluid, which typically comprises an organic oil including a volatile and/or semi-volatile hydrocarbon, ester, and/or ether. General examples of such organic fluids include volatile hydrocarbon oils, such as $C_6$-$0_{16}$ alkanes, $C_8$-$0_{16}$ isoalkanes (e.g. isodecane, isododecane, isohexadecane, etc.) $C_8$-$0_{16}$ branched esters (e.g. isohexyl neopentanoate, isodecyl neopentanoate, etc.), and the like, as well as derivatives, modifications, and combinations thereof. Additional examples of suitable organic fluids include aromatic hydrocarbons, aliphatic hydrocarbons, alkyl halides, aromatic halides, and combinations thereof. Hydrocarbons include isododecane, isohexadecane, Isopar L ($C_{11}$-$C_{13}$), Isopar H ($C_{11}$-$C_{12}$), hydrogentated polydecene.

Other carrier vehicles may also be utilized in the composition. For example, in some embodiments, the carrier vehicle comprises, alternatively is, an ionic liquid. Examples of ionic liquids include anion-cation combinations. Generally, the anion is selected from alkyl sulfate-based anions, tosylate anions, sulfonate-based anions, bis(trifluoromethanesulfonyl)imide anions, bis(fluorosulfonyl)imide anions, hexafluorophosphate anions, tetrafluoroborate anions, and the like, and the cation is selected from imidazolium-based cations, pyrrolidinium-based cations, pyridinium-based cations, lithium cation, and the like. However, combinations of multiple cations and anions may also be utilized. Specific examples of the ionic liquids typically include 1-butyl-1-methylpyrrolidinium bis(trifluoromethanesulfonyl)imide, 1-methyl-1-propylpyrrolidinium bis-(trifluoromethanesulfonyl)imide, 3-methyl-1-propylpyridinium bis(trifluoromethanesulfonyl)imide, N-butyl-3-methylpyridinium bis (trifluoromethanesulfonyl)imide, 1-methyl-1-propylpyridinium bis(trifluoromethanesulfonyl)imide, diallyldimethylammonium bis(trifluoromethanesulfonyl)imide, methyltrioctylammonium bis(trifluoromethanesulfonyl)imide, 1-butyl-3-methylimidazolium bis(trifluoromethanesulfonyl)imide, 1,2-dimethyl-3-propylimidazolium bis (trifluoromethanesulfonyl)imide, 1-ethyl-3-methylimidazolium bis(trifluoromethanesulfonyl)imide, 1-vinylimidazolium.bis(trifluoromethanesulfonyl)imide, 1-allyl imidazolium bis(trifluoromethanesulfonyl)imide, 1-allyl-3-methylimidazolium bis(trifluoromethanesulfonyl)imide, lithium bis(trifluoromethanesulfonyl)imide, and the like, as well as derivatives, modifications, and combinations thereof.

When utilized, portions of carrier vehicle or solvent may be added to or otherwise combined with the hydridochlorosilane compound (A), catalyst (C), and/or olefin compound (D) (when utilized) discretely, collectively with mixtures of components (A), (C) and/or (D), or with the reaction mixture as a whole. The total amount of carrier vehicle/solvent present in the reaction mixture will be selected by one of skill in the art, e.g. based on the particular components (A), (C), and/or (D) selected, the reaction parameters employed, etc.).

In some embodiments, the reaction is carried out at the elevated temperature. The elevated temperature will be selected and controlled depending on the particular hydridochlorosilane compound (A), catalyst (C), and/or olefin compound (D) selected, the reaction vessel utilized (e.g. whether open to ambient pressure, sealed, under positive pressure (e.g. positive pressure of ethylene (B)), the presence and boiling point of carrier vehicle, etc. Likewise, as the temperature of the reaction may influence the pressure in the vessel, and thus the solubilized ethylene concentration therein, the temperature may be selected based on the type of silylation reaction desired (i.e., based on the particular organosilicon compound being prepared). Accordingly, the elevated temperature will be readily selected by one of skill in the art in view of the reaction conditions and parameters selected and the description herein.

Typically, the elevated temperature is from greater than ambient temperature to 300 ° C., such as from 30 to 250, alternatively from 40 to 200° C. In certain embodiments, the elevated temperature is from greater than ambient temperature to 200° C., such as from 30 to 150, alternatively from 40 to 150, alternatively from 40 to 125, alternatively from 40 to 100, alternatively from 50 to 100° C. In some such embodiments, the silylation reaction is configured as the dehydrogenative coupling reaction. In other embodiments, the elevated temperature is from greater than ambient temperature to 200° C., such as from 60 to 200, alternatively from 70 to 200, alternatively from 70 to 150, alternatively from 80 to 150, alternatively from 90 to 150, alternatively from 100 to 150° C. In certain such embodiments, the silylation reaction is configured as the hydrosilylation reaction.

As introduced above, the reaction may be conducted at around ambient pressure or, alternatively, at an elevated pressure (e.g. a super-atmospheric pressure). For example, in some embodiments, the vessel is pressurized with ethylene (e.g. via a gas manifold) such that the reaction is carried out at a pressure that is greater than atmospheric pressure. Typically, ethylene is employed at a pressure less than 200,000 kPa, such as from 100 to 20,000 kPa. However, the overall pressure is not particularly limited as an individual parameter of the reaction conditions, but rather will be selected/controlled/achieved based on the relative amount of solubilized ethylene in the reaction, as described above.

In certain embodiments, the reaction is carried out at atmospheric pressure. In other embodiments, the reaction is carried out at a pressure from about atmospheric pressure to 20,000 kPa, such as from 100 to 15,000, alternatively from 100 to 12,000, alternatively from 100 to 11,000, alternatively from 100 to 10,500 kPa. In certain embodiments, ethylene is employed at a pressure from greater than atmospheric pressure to 200,000 kPa, such as from 105 to 25,000, alternatively from 150 to 20,000, alternatively from 200 to 20,000, alternatively from 500 to 20,000, alternatively from 1,000 to 20,000, alternatively from 2,000 to 20,000, alternatively from 5,000 to 20,000 kPa.

It is to be appreciated that the elevated temperature and/or pressure may also differ from the ranges set forth above, especially when both elevated temperature and pressure are utilized. In particular, as described above, the pressure of the reaction influences the reaction selectivity, and may be influenced by the reaction temperature employed, as described above. In specific embodiments, the elevated temperature and pressure are collectively selected to provide supercritical conditions with regard to one or both of components (A) and (B). Likewise, it is also to be appreciated that reaction parameters may be modified during the reaction of components (A) and (B). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof.)

In particular embodiments, the reaction is carried out at a pressure of from greater than ambient pressure to 200,000 kPa, such as from greater than 101.3 to 20,000, alternatively from 110 to 10,000, alternatively from 150 to 5,000, alternatively from 200 to 2,000, alternatively from 200 to 1,000, alternatively from 250 to 1,000, alternatively from 250 to 750 kPa. In some such embodiments, the silylation reaction is configured as the dehydrogenative coupling reaction.

The time during which the reaction of components (A) and (B) to prepare the organosilicon compound is carried out is a function of scale, reaction parameters and conditions, selection of particular components, etc. On a relatively large scale (e.g. greater than 1, alternatively 5, alternatively 10, alternatively 50, alternatively 100 kg), the reaction may be carried out for hours, such as from 2 to 48, alternatively from 3 to 36, alternatively from 4 to 24, alternatively of 6, 12, 18, 24, 36, or 48 hours, as will be readily determined by one of skill in the art (e.g. by monitoring conversion of the hydridochlorosilane compound (A), production of the organosilicon compound, etc., via chromatographic and/or spectroscopic methods). In certain embodiments, the time during which the reaction is carried out is from greater than 0 to 48 hours, such as from 1 to 36, alternatively from 1 to 24, alternatively from 1 to 12, alternatively from 2 to 12, alternatively from 2 to 10 hours after components (A) and (B) are combined in the presence of catalyst (C), optionally after reaching the elevated temperature and/or pressure.

Generally, the reaction of components (A) and (B) prepares a reaction product comprising the organosilicon compound. In particular, over the course of the reaction, the reaction mixture comprising components (A) and (B) comprises increasing amounts of the organosilicon compound and decreasing amounts of components (A) and (B). Once the reaction is complete (e.g. one of components (A) and (B) is consumed, no additional organosilicon compound is being prepared, etc.), the reaction mixture may be referred to as a reaction product comprising the organosilicon compound. In this fashion, the reaction product typically includes any remaining amounts of components (A), (B), (C), and optionally (D), as well as degradation and/or other reaction products thereof (e.g. byproducts and/or other materials), any carrier vehicle or solvent utilized, etc.

In certain embodiments, the method further comprises isolating and/or purifying the organosilicon compound from the reaction product. As used herein, isolating the organosilicon compound is typically defined as increasing the relative concentration of the organosilicon compound as compared to other compounds in combination therewith (e.g. in the reaction product or a purified version thereof). As such, as is understood in the art, isolating/purifying may comprise removing the other compounds from such a combination (i.e., decreasing the amount of impurities/other components combined with the organosilicon compound, e.g. in the reaction product) and/or removing the organosilicon compound itself from the combination. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any another technique to isolate the organosilicon compound. It is to be appreciated that isolating may include, and thus may be referred to as, purifying the organosilicon compound. However, purifying the organosilicon compound may comprise alternative and/or additional techniques as compared to those utilized in isolating the organosilicon compound. Regardless of the particular technique(s) selected, isolation and/or purification of organosilicon compound may be performed in sequence (i.e., in line) with the reaction itself, and thus may be automated. In other instances, purification may be a stand-alone procedure to which the reaction product comprising the organosilicon compound is subjected. In certain embodiments, the organosilicon compound is purified by venting and/or purging the reaction vessel and reaction product, e.g. to remove any remaining ethylene (B), hydrogen (H$_2$), etc. prepared during the reaction. In some such embodiments, the reaction product is cooled during the venting and or purging.

In particular embodiments, the preparation method includes isolating the organosilicon compound from the reaction product via distillation, where the organosilicon compound is removed from one or more components of the reaction product (e.g. the catalyst (C)) as distillate. The distillation is typically carried out at sub-atmospheric pressure and temperature (i.e., reduced temperature and reduced pressure). The reduced pressure and temperature will be selected by one of skill in the art in view of the reaction conditions and parameters selected, the components utilized, the organosilicon compound prepared, etc. The reduced pressure is typically operated as a vacuum, although any reduced pressure between vacuum and atmospheric pressure (i.e., 101.325 kPa) may be utilized. For example, the reduced pressure may be from greater than 0 to 50, alternatively from greater than 0 to 40, alternatively from greater than 0 to 30, alternatively from greater than 0 to 20, alternatively from greater than 0 to 10, alternatively from greater than 0 to 5, alternatively from greater than 0 to 4, alternatively from greater than 0 to 3, alternatively from greater than 0 to 2 kPa (e.g. as measured by mmHg).

Typically, the reaction product prepared by the reaction of components (A) and (B) includes a catalyst residue comprising a ruthenium complex. The ruthenium complex of the catalyst residue may be the same as, alternatively substantially the same as, the Ru(0) complex utilized in or as component (C) in the reaction. Alternatively, the ruthenium complex of the catalyst residue may be a derivative of the Ru(0) complex utilized in or as component (C) in the reaction, e.g. formed from the Ru(0) complex during the reaction.

In certain embodiments, the preparation method includes isolating the catalyst residue from the reaction mixture, e.g. using one or more of the techniques described above. In some embodiments, isolating the organosilicon compound from the reaction product via distillation isolates the catalyst residue by removing other components of the reaction product as distillate therefrom.

The isolated catalyst residue may be utilized to catalyze another silylation reaction, e.g. of components (A) and (B), optionally in the presence of component (D), as described above. As such, in certain embodiments, the preparation method comprises using the catalyst residue (i.e., reusing the catalyst (C)) to catalyze a further silylation reaction, which may be the same as or different from the initial reaction used to prepare the catalyst residue. For example, in some embodiments, the method comprises two sequential dehydrogenative coupling reactions using the catalyst (C) and the catalyst residue, respectively. In other embodiments, the method comprises two sequential hydrosilylation reactions using the catalyst (C) and the catalyst residue, respectively. However, the preparation method provides for increased processes utility by allowing for modification of the process output (e.g. in terms of the organosilicon compound being prepared) by allowing for expedient change of the reaction selectivity (e.g. via modification of the ethylene partial pressure within the reaction vessel). As such, in certain embodiments, the method comprises carrying out the silylation reaction described above, isolating the catalyst (C) (or a derivative thereof, e.g. via collecting the catalyst residue), and then using the isolated catalyst (C) or derivative thereof to catalyze a further silylation reaction that is different than the first. For example, in some such embodiments, the silylation reaction is further defined as a dehydrogenative coupling and the further silylation reaction is further defined as a hydrosilylation. In other such embodiments, the silylation reaction is further defined as a hydrosilylation and the further silylation reaction is further defined as a dehydrogenative coupling.

It will be appreciated that the reuse of the catalyst (C) in this fashion may be conducted any number of times, for any number of sequential independently selected silylation reactions, which may each be the same as or different from any other of the silylation reactions. In certain embodiments, the catalyst (C) is reused at least once, alternatively at least twice, alternatively at least 3, 4, 5, 6, 7, 8, 9, or 10 times.

As introduced above, the preparation method prepares the organosilicon compound. As will be appreciated by those of skill in the art, the particular organosilicon compound prepared is a function of the particular hydridochlorosilane compound (A) utilized in the preparation method and the type of silylation reaction selected. More specifically, as will be understood in view of the description above of the structure of components (A) and (B) and parameters of the reaction thereof, the method prepares the organosilicon compound either as a dehydrogenative coupling product or as a hydrosilylation product of the hydridochlorosilane compound (A) and ethylene (B). In either case, the hydridochlorosilane compound (A) forms an organochlorosilane backbone of the organosilicon compound, and the ethylene (B) forms a vinyl or ethyl group bonded to a silicon atom of the organochlorosilane backbone.

In general, the organosilicon compound has the general formula Y-SiCl$_x$R$_{3-x}$, where Y is a vinyl group or an ethyl group, and subscript x and each R are as defined above. More specifically, subscript x is typically 1, 2, or 3, and each R is an independently selected unsubstituted hydrocarbyl group having from 1 to 18 carbon atoms (e.g. methyl, ethyl, etc.).

In some embodiments, Y is the vinyl group and x is 1 or 2, such that the organosilicon compound may be further defined as an organovinylchlorosilane compound. For example, in some embodiments, where the hydridochlorosilane compound (A) is further defined as the diorganohydridochlorosilane (e.g., where subscript x is 1, such that compound (A) has the formula HSiClR$_2$), the preparation method prepares the organosilicon compound as a diorganovinylchlorosilane compound having the formula (H$_2$CCH)SiClR$_2$, where each R is as defined above. In other embodiments, where the hydridochlorosilane compound (A) is further defined as the organohydridodichlorosilane (e.g., where subscript x is 2, such that compound (A) has the formula HSiCl$_2$R), the preparation method prepares the organosilicon compound as an organovinyldichlorosilane compound having the formula (H$_2$CCH)SiCl$_2$R, where R is as defined above. In some embodiments, each R is an alkyl group, such that the organosilicon compound is further defined as a dialkylvinylchlorosilane or an alkylvinyldichlorosilane. In certain embodiments, each R is methyl (i.e., —CH$_3$), such that the organosilicon compound is further defined as dimethylvinylchlorosilane or methylvinyldichlorosilane.

In certain embodiments, Y is the ethyl group and x is 1 or 2, such that the organosilicon compound may be further defined as an organoethylchlorosilane compound. For example, in some embodiments, where the hydridochlorosilane compound (A) is further defined as the diorganohydridochlorosilane (e.g., where subscript x is 1, such that compound (A) has the formula HSiClR$_2$), the preparation method prepares the organosilicon compound as a diorganoethylchlorosilane compound having the formula $(H_3CCH_2)SiClR_2$, where each R is as defined above. In other embodiments, where the hydridochlorosilane compound (A) is further defined as the organohydridodichlorosilane (e.g., where subscript x is 2, such that compound (A) has the formula $HSiCl_2R$), the preparation method prepares the organosilicon compound as an organoethyldichlorosilane compound having the formula $(H_3CCH_2)SiCl_2R$, where R is as defined above. In some embodiments, each R is an alkyl group, such that the organosilicon compound is further defined as a dialkylethylchlorosilane or an alkylethyldichlorosilane. In certain embodiments, each R is methyl (i.e., —$CH_3$), such that the organosilicon compound is further defined as dimethyethylchlorosilane or methyethyldichlorosilane. It will be appreciated that the organosilicon compound may comprise a combination of such compounds as well, i.e., when more than one of the hydridochlorosilane compound (A) is utilized in the preparation method.

The organosilicon compound prepared according to the preparation method may be utilized in diverse end use applications, e.g. as a discrete component in a composition, including a curable composition, a personal care or cosmetic composition, etc. For example, when the organosilicon compound prepared includes at least one aliphatically unsaturated group per molecule (e.g. the silicon-bonded vinyl group prepared from the ethylene (B)), the organosilicon compound may be utilized in further alkene-based reactions, e.g. in a hydrosilylation reaction. For example, the organosilicon compound may be a component in a hydrosilylation-curable composition. When the organosilicon compound prepared includes at least one ethyl group per molecule (e.g. the silicon-bonded ethyl group prepared from the ethylene (B)), the organosilicon compound may be utilized in as an endcapping agent or building block for reducing the end methyl content of a silicone composition.

The following examples are intended to illustrate the embodiments described herein and are not to be viewed in any way as limiting to the scope of the invention.

Characterization Procedure(s)

Gas Chromatography (GC)

Gas chromatography (GC) data are obtained using an Agilent 7890A gas chromatograph fitted with a Thermo Scientific TG-5HT column. Detection of the eluting species is accomplished using a flame ionization detector (FID). A sample (1 µL) is injected onto the column, which is held at 40° C. for 8 minutes from time of injection, after which the temperature increased to 300° C. at a rate of 15° C./min. Elution times are determined by injection of standards, and product quantification was determined by integration of elution signal areas. Exemplary standards (with elution times) include dimethylchlorosilane (1.90 min.), methyldichlorosilane (1.93 min.), vinyldimethylchlorosilane (2.44 min.), vinylmethyldichlorosilane (2.79 min.), ethyldimethylchlorosilane (2.62 min.), and ethylmethyldichlorosilane (3.05 min.).

Components and Materials

Certain components utilized in the Examples are set forth in Table 1 below.

TABLE 1

Components and Materials Utilized

| Compound | Description |
|---|---|
| Hydridosilane (A-1) | Dimethylchlorosilane |
| Hydridosilane (A-2) | Methyldichlorosilane |

TABLE 1-continued

Components and Materials Utilized

| Compound | Description |
|---|---|
| Catalyst (C-1) | $Ru_3(CO)_{12}$ |
| Olefin (D-1) | Norbornene |
| Ligand (L-1) | Triphenylphosphine |
| Ligand (L-2) | Pentafluorophenyldiphenylphosphine |
| Ligand (L-3) | Tris(3,5-bis(trifluoromethyl)phenyl)phosphine |
| Ligand (L-4) | Tricyclohexylphosphine |
| Ligand (L-5) | 1,3-bis(dicyclohexylphosphino)propane |
| Ligand (L-6) | Triphenylphosphite |
| Ligand (L-7) | 1,3-bis(diphenylphosphino)propane |
| Solvent (S-1) | Toluene |

Examples 1-2

Preparation of Vinyldimethylchlorosilane (CIS-$RCH_3)_2(CHCH_2)$)

Catalyst (C) (1.9 mg, 9.0 pmol Ru) is added to a Schlenk tube under ambient conditions. The tube is then evacuated and backfilled with nitrogen several times. Solvent (S-1) (12 mL) is then transferred to the tube via cannula, and the resulting mixture stirred with gentle heating for twenty minutes to form a solution. The solution is then cooled to room temperature and charged with Hydridosilane (A) (100 µL, 900 µmol), and the resulting solution transferred via cannula to a Fischer-Porter tube equipped with a stir bar and a manifold for introduction of ethylene. The tube is then pressurized with ethylene to five bar, and then vented. The tube is pressurized with ethylene, followed by venting, four additional times to substantially eliminate nitrogen from the tube. The tube is then pressurized with ethylene to five bar and the solution warmed to and held at 100° C. with stirring for two hours. The solution is then cooled to -78° C., the tube vented. The solution is then transferred via cannula to a Schlenk tube, and then to a distillation apparatus with a collection vessel cooled to −78° C. The solution is then distilled at sub-atmospheric pressure and at a temperature less than 25° C. to remove a volatile product mixture comprising an organosilicon compound as distillate from a catalyst residue. The distillate is then warmed to room temperature and analyzed by gas chromatography to evaluate conversion of Hydridosilane (A) and yield of the organosilicon compound, the results of which are set forth in Table 2 below.

Comparative Example 1

The procedure set forth in Examples 1-2 above is repeated without addition of Catalyst (C), the results of which are set forth in Table 2 below.

TABLE 2

Parameters and Properties of Examples 1-2 and Comparative Example 1

| Example: | Comp. Ex. 1 | Ex. 1 | Ex. 2 |
|---|---|---|---|
| Hydridosilane (A): | A-1 | A-1 | A-1 |
| Catalyst (C): | None | C-1 | C-1 |
| Conversion of A (%): | N/A | >99 | >99 |
| Yield (%): | N/A | 75 | 79 |

In Examples 1-2, the organosilicon compound prepared is vinyldimethylchlorosilane. As shown in Table 2, the exemplary methods provide nearly complete conversion of hydridosilane starting material with good yields of the dehydrogenative coupling product. In each of Examples 1-2, ethyldimethylchlorosilane is identified as the major side product, evidencing hydrosilylation as a competing reaction under the conditions utilized. As also shown in Table 2 above, no significant conversion of Hydridosilane (A-1) is observed in the absence of Catalyst (C) (see Comparative Example 1).

Examples 3-11

Preparation of Vinyldimethylchlorosilane (ClSi(CH$_3$)$_2$(CHCH$_2$))

Catalyst (C-1) (1.9 mg, 9.0 pmol Ru) and Ligand (L) are added to a Schlenk tube under ambient conditions. The tube is then evacuated and backfilled with nitrogen several times. Solvent (S) (12 mL) is then transferred to the tube via cannula, and the resulting mixture stirred with gentle heating for twenty minutes to form a solution. The solution is then cooled to room temperature and charged with Hydridosilane (A-1) (100 µL, 900 µmol), and the resulting mixture transferred via cannula to a Fischer-Porter tube equipped with a stir bar and a manifold for introduction of ethylene. The tube is then pressurized with ethylene to five bar, and then vented. The tube is pressurized with ethylene, followed by venting, four additional times to substantially eliminate nitrogen from the tube. The tube is then pressurized with ethylene to five bar and the solution warmed to and held at 100° C. with stirring for two hours. The solution is then cooled to −78° C., the tube vented. The solution is then transferred via cannula to a Schlenk tube, and then to a distillation apparatus with a collection vessel cooled to −78° C. The solution is then distilled at sub-atmospheric pressure and at a temperature less than 25° C. to remove a volatile product mixture comprising an organosilicon compound as distillate from a catalyst residue. The distillate is then warmed to room temperature and analyzed by gas chromatography to evaluate conversion of Hydridosilane (A-1) and yield of the organosilicon compound. Particular parameters and evaluation results of Examples 3-11 are set forth in Table 3 below.

TABLE 3

Parameters and Properties of Examples 3-11

| Example | Ligand (L) | Amount (L) (mg [µmol]) | Conversion of (A) (%) | Yield (%) |
|---|---|---|---|---|
| Ex. 3 | L-1 | 4.7 [18] | >99 | 88 |
| Ex. 4 | L-1 | 4.7 [18] | >99 | 84 |
| Ex. 5 | L-2 | 6.3 [18] | >99 | 91 |
| Ex. 6 | L-2 | 6.3 [18] | >99 | 91 |
| Ex. 8 | L-3 | 4.0 [18] | >99 | 82 |
| Ex. 9 | L-4 | 1.7 [18] | >99 | 75 |
| Ex. 7 | L-5 | 3.9 [9.0] | >99 | 80 |
| Ex. 10 | L-6 | 1.9 [9.0] | >99 | 78 |
| Ex. 11 | L-7 | 1.2 [9.0] | >99 | 77 |

In Examples 3-11, the organosilicon compound prepared is vinyldimethylchlorosilane. As shown in Table 3 above, the exemplary methods provide nearly complete conversion of hydridosilane starting material with good yields of the dehydrogenative coupling product. In each of Examples 3-11, ethyldimethylchlorosilane is identified as the major side product, evidencing hydrosilylation as a competing reaction under the conditions utilized.

Examples 12-14

Preparation of Vinyldimethylchlorosilane (ClSi(CH$_3$)$_2$(CHCH$_2$))

Catalyst (C-1) (1.9 mg, 9.0 pmol) and Ligand (L) are added to a Schlenk tube under ambient conditions. The tube is then evacuated and backfilled with nitrogen several times. Solvent (S-1) (12 mL) is then transferred to the tube via cannula, and the resulting mixture stirred with gentle heating for twenty minutes to form a solution. The solution is then cooled to room temperature and charged with Hydridosilane (A-1) (100 µL, 900 µmol) and Sacrificial Olefin (D-1), and the resulting mixture transferred via cannula to a Fischer-Porter tube equipped with a stir bar and a manifold for introduction of ethylene. The tube is then pressurized with ethylene to five bar, and then vented. The tube is pressurized with ethylene, followed by venting, four additional times to substantially eliminate nitrogen from the tube. The tube is then pressurized with ethylene to five bar and the solution warmed to and held at 100° C. with stirring for two hours. The solution is then cooled to -78° C., the tube vented. The solution is then transferred via cannula to a Schlenk tube, and then to a distillation apparatus with a collection vessel cooled to −78° C. The solution is then distilled at sub-atmospheric pressure and at a temperature less than 25° C. to remove a volatile product mixture comprising an organosilicon compound as distillate from a catalyst residue. The distillate is then warmed to room temperature and analyzed by gas chromatography to evaluate conversion of Hydridosilane (A-1) and yield of the organosilicon compound. Particular parameters and evaluation results of Examples 12-14 are set forth in Table 4 below.

TABLE 4

Parameters and Properties of Examples 12-14

| Example: | Ex. 12 | Ex. 13 | Ex. 14 |
|---|---|---|---|
| Olefin (D-1) (mg [mmol]): | 420 [4.5] | 420 [4.5] | 420 [4.5] |
| LIGAND (L-1) (mg [µmol]): | None | 4.7 [18] | None |
| LIGAND (L-2) (mg [µmol]): | None | None | 6.3 [18] |
| Conversion of (A) (%): | >99 | >99 | >99 |
| Yield (%): | 84 | 88 | 96 |

In Examples 12-14, the organosilicon compound prepared is vinyldimethylchlorosilane. As shown in Table 4 above, the exemplary methods provide nearly complete conversion of hydridosilane starting material with good yields of the dehydrogenative coupling product. In each of Examples 12-14, ethyldimethylchlorosilane is identified as the major side product, evidencing hydrosilylation as a competing reaction under the conditions utilized.

Examples 15-20

Preparation of Vinylmethyldichlorosilane (Cl$_2$MeSiCHCH$_2$)

Catalyst (C-1) (2.1 mg, 9.6 µmol) and Ligand (L) are added to a Schlenk tube under ambient conditions. The tube is then evacuated and backfilled with nitrogen several times. Solvent (S) (12 mL) is then transferred to the tube via cannula, and the resulting mixture stirred with gentle heating for twenty minutes to form a solution. The solution is then cooled to room temperature and charged with Hydridosilane (A-2) (100 µL, 900 µmol), and the resulting mixture transferred via cannula to a Fischer-Porter tube equipped with a stir bar and a manifold for introduction of ethylene. The tube is then pressurized with ethylene to five bar, and then vented. The tube is pressurized with ethylene, followed by venting, four additional times to substantially eliminate nitrogen from the tube. The tube is then pressurized with ethylene to five bar and the solution warmed to and held at 100° C. with stirring for time (T). The solution is then cooled to −78° C., the tube vented. The solution is then transferred via cannula to a Schlenk tube, and then to a distillation apparatus with a collection vessel cooled to −78° C. The solution is then distilled at sub-atmospheric pressure and at a temperature less than 25° C. to remove a volatile product mixture comprising an organosilicon compound as distillate from a catalyst residue. The distillate is then warmed to room temperature and analyzed by gas chromatography to evaluate conversion of Hydridosilane (A-2) and yield of the organosilicon compound. Particular parameters and evaluation results of Examples 15-20 are set forth in Table 5 below.

Comparative Example 2

The procedure set forth in Examples 15-20 above is repeated without addition of Catalyst (C), the results of which are set forth in Table 5 below.

TABLE 5

Parameters and Properties of Examples 15-20 and Comparative Example 2

| Example | Hydridosilane (A) | Ligand (L) | Amount (L) (mg [µmol]) | Time (T) (hours) | Conversion of A (%) | Yield (%) |
|---|---|---|---|---|---|---|
| Comp. Ex. 2 | A-2 | L-6 | 6.0 [19.2] | 10 | N/A | N/A |
| Ex. 15 | A-2 | L-6 | 6.0 [19.2] | 2 | 40 | 29 |
| Ex. 16 | A-2 | L-6 | 6.0 [19.2] | 10 | >78 | 58 |
| Ex. 17 | A-2 | None | N/A | 2 | >99 | 44 |
| Ex. 18 | A-2 | L-1 | 5.0 [19.2] | 2 | 14 | 3.3 |
| Ex. 19 | A-2 | L-5 | 5.4 [19.2] | 2 | 97 | 34 |
| Ex. 20 | A-2 | L-2 | 6.8 [19.2] | 2 | 97 | 34 |

In Examples 15-20, the organosilicon compound prepared is dichloromethylvinylsilane. As shown in Table 5 above, the exemplary methods provide conversion of the hydridosilane starting material to the dehydrogenative coupling product, in adequate yields. No significant conversion of Hydridosilane (A-2) is observed in the absence of Catalyst (C) (see Comparative Example 2). In each of Examples 15-20, ethylmethyldichlorosilane is identified as the major side product, evidencing hydrosilylation as a competing reaction under the conditions utilized.

Examples 21-22

Sequential Preparation of Vinyldimethylchlorosilane (ClSi(CH$_3$)$_2$(CHCH$_2$))

Example 21: First Preparation

A hydridosilane is dehydrogenatively coupled to ethylene with a catalyst in a first preparation to give an organosilicon compound (Example 21). In particular, Catalyst (C-1) (1.9 mg, 9.0 µmol) is added to a Schlenk tube under ambient conditions. The tube is then evacuated and backfilled with nitrogen several times. Solvent (S-1) (12 mL) is then transferred to the tube via cannula, and the resulting mixture stirred with gentle heating for twenty minutes to form a solution. The solution is then cooled to room temperature and charged with Hydridosilane (A-1) (100 µL, 900 µmol), and the resulting solution transferred via cannula to a Fischer-Porter tube equipped with a stir bar and a manifold for introduction of ethylene. The tube is then pressurized with ethylene to five bar, and then vented. The tube is pressurized with ethylene, followed by venting, four additional times to substantially eliminate nitrogen from the tube. The tube is then pressurized with ethylene to five bar and the solution warmed to and held at 100° C. with stirring for two hours. The solution is then cooled to −78° C., the tube vented. The solution is then transferred via cannula to a Schlenk tube, and then to a distillation apparatus with a collection vessel cooled to −78° C. The solution is then distilled down to a volume of ~2 mL at sub-atmospheric pressure and at a temperature less than 25° C., removing a first product mixture comprising an organosilicon compound as distillate and leaving a concentrated catalyst residue, which is set aside. The distillate is then warmed to room temperature and analyzed by gas chromatography, with the following results: conversion of dimethylchlorosilane >99%; yield of vinyldimethylchlorosilane =75%; ethyldimethylchlorosilane as the major side product.

Example 22

Second Preparation

A hydridosilane is dehydrogenatively coupled to ethylene with a recycled catalyst in a second preparation to give an organosilicon compound (Example 22). In particular, the concentrated catalyst residue set aside in Example 21 above is transferred to a Schlenk tube and diluted to 12 mL with Solvent (S-1). The resulting mixture is then utilized in the procedure of Example 21 above to give a second product mixture comprising an organosilicon compound, which is analyzed by gas chromatography to evaluate conversion of Hydridosilane (A-1) and yield of the organosilicon compound from the second preparation with the following results: conversion of dimethylchlorosilane >99%; yield of vinyldimethylchlorosilane=76%; ethyldimethylchlorosilane as the major side product.

Examples 23-32

Sequential Preparation of Vinyldimethylchlorosilane (ClSi(CH$_3$)$_2$(CHCH$_2$))

Example 23

First Preparation

A hydridosilane is dehydrogenatively coupled to ethylene with a catalyst in a first preparation to give an organosilicon compound (Example 23). In particular, Catalyst (C-1) (1.9 mg, 9.0 µmol) and Ligand (L-2) (6.3 mg, 18 µmol) are added to a Schlenk tube under ambient conditions. The tube is then evacuated and backfilled with nitrogen several times. Solvent (S-1) (12 mL) is then transferred to the tube via cannula, and the resulting mixture stirred with gentle heating for twenty minutes to form a solution. The solution is then cooled to room temperature and charged with Hydridosilane (A-1) (100 µL, 900 µmol), and the resulting solution transferred via cannula to a Fischer-Porter tube equipped with a stir bar and a manifold for introduction of ethylene. The tube is then pressurized with ethylene to five bar, and then vented. The tube is pressurized with ethylene, followed by venting, four additional times to substantially eliminate nitrogen from the tube. The tube is then pressurized with ethylene to five bar and the solution warmed to and held at 100° C. with stirring for two hours. The solution is then cooled to –78° C., the tube vented. The solution is then transferred via cannula to a Schlenk tube, and then to a distillation apparatus with a collection vessel cooled to –78° C. The solution is then distilled down to a volume of ~2 mL at sub-atmospheric pressure and at a temperature less than 25° C., removing a first product mixture comprising an organosilicon compound as distillate and leaving a concentrated catalyst residue, which is set aside. The distillate is then warmed to room temperature and analyzed by gas chromatography, the results of which are shown in Table 6 below.

Example 24: Second Preparation

The concentrated catalyst residue set aside in Example 23 above is transferred to a Schlenk tube and diluted to 12 mL with Solvent (S-1). The resulting mixture is then utilized in the procedure of Example 23 in a second preparation to give a second product mixture comprising the organosilicon compound and a second concentrated catalyst residue (Example 24). The second product mixture is then warmed to room temperature and analyzed by gas chromatography, the results of which are shown in Table 6 below.

Examples 25-32: Third-Tenth Preparations

The procedure of Example 25 above is repeated sequentially over a series of eight preparations using the concentrated catalyst residues prepared in the previous preparation (i.e., beginning with the second concentrated catalyst residue prepared in Example 24) to give eight product mixtures comprising the organosilicon compound (Examples 25-32). The product mixtures of Examples 25-32 are each analyzed by gas chromatography, the results of which are shown in Table 6 below.

TABLE 6

Examples 23-32: Sequential Preparations of Vinyldimethylchlorosilane

| Example | Conversion of A (%) | Yield (%) |
|---|---|---|
| Ex. 23 | >99 | 81 |
| Ex. 24 | >99 | 86 |
| Ex. 25 | >99 | 88 |
| Ex. 26 | >99 | 89 |
| Ex. 27 | >99 | 89 |
| Ex. 28 | >99 | 86 |
| Ex. 29 | >99 | 87 |
| Ex. 30 | >99 | 80 |
| Ex. 31 | >99 | 80 |
| Ex. 32 | >99 | 74 |

In Examples 23-32, the organosilicon compound prepared is vinyldimethylchlorosilane, with ethyldimethylchlorosilane identified as the major side product in each preparation. As shown in Table 6 above, the exemplary methods and materials provide nearly complete conversion of hydridosilane starting material with good yields of the dehydrogenative coupling product. Moreover, the reaction product is easily removed from the catalyst residue, which may be conveniently recycled in sequential preparations without additional processing steps or loss of conversion or yield.

Examples 33-34

Selective Preparation of Vinyl- and Ethyl-Functionalized Silanes

Example 33: Selective Preparation of Vinyldimethylchlorosilane (ClSi(CH$_3$)$_2$(CHCH$_2$))

In an inerted glovebox, Solvent (S-1) (30.15 g) is measured into a glass screw-top container. The container is then charged with Catalyst (C-1) (26 mg) and a magnetic stir bar, sealed, and placed on a magnetic stir plate out of the glovebox. The mixture is stirred and heated to 50° C. to dissolve the catalyst metal complex, and then returned to the glovebox and allowed to cool to ambient temperature. Hydridosilane (A-1) (13.54 g) is then added to the solution to give a reaction mixture, which is then charged with nonane (1.13 g) as an internal reference standard for gas chromatographic analysis. A reference sample of the reaction mixture (1 g aliquot) is taken into a glass vial, diluted with Solvent (S-1) (4 g), and analyzed to determine the starting concentration of Hydridosilane (A-1) in the reaction mixture.

The reaction mixture is transferred to a stainless-steel sample cylinder, which is then sealed, removed from the glovebox, and connected to an inert reactor system (100 mL stirred reactor, Parr Inst. Co.) via stainless steel transfer lines, with are then nitrogen purged for 10 minutes. The reaction mixture is transferred into the reactor via nitrogen pressurization (10 psig, ~68.9 kPa), and the reactor purged with ethylene (3×100 psig, ~689 kPa; 1 min stirring). The reactor is then pressurized with ethylene (610 psig, ~4,206 kPa) and stirred (350 rpm) until saturated (stable pressure), sealed, and heated to and held at 40° C. with stirring. After a 10-minute stabilization period, the reactor is then heated to 100° C. (2° C./min ramp to prevent temperature overshoot), and held at that temperature for 90 minutes. The reactor is then cooled to room temperature (external fan), depressurized, and then purged three times with nitrogen (100 psig, ~689 kPa). The reactor is then connected to a nitrogen flow (10 psig, ~68.9 kPa), which is used to transfer the reaction mixture to a stainless-steel sample cylinder. The cylinder is sealed and transported into an inerted glovebox, and the contents transferred to a glass vial. A reference sample of the reaction mixture (1 g aliquot) is taken into a glass vial, diluted with Solvent (S-1) (4 g), and analyzed by gas chromatography to evaluate conversion of Hydridosilane (A-1) and yield of the organosilicon compound, with the following results: yield of vinyldimethylchlorosilane =84%; ethyldimethylchlorosilane as the major side product (13.5%).

Example 33: Selective Preparation of Ethyldimethylchlorosilane (ClSi(CH$_3$)$_2$(CH$_2$CH$_3$))

In an inerted glovebox, Solvent (S-1) (30.15 g) is measured into a glass screw-top container. The container is then charged with Catalyst (C-1) (25 mg) and a magnetic stir bar, sealed, and placed on a magnetic stir plate out of the glovebox. The mixture is stirred and heated to 50° C. to dissolve the catalyst metal complex, and then returned to the glovebox and allowed to cool to ambient temperature. Hydridosilane (A-1) (13.50 g) is then added to the solution to give a reaction mixture, which is then charged with nonane (1.18 g) as an internal reference standard for gas chromatographic analysis.

A reference sample of the reaction mixture (1 g aliquot) is taken into a glass vial, diluted with Solvent (S-1) (4 g), and analyzed to determine the starting concentration of Hydridosilane (A-1). The reaction mixture is transferred to a stainless-steel sample cylinder, which is then sealed, removed from the glovebox, and connected to an inert reactor system (100 mL stirred reactor, Parr Inst. Co.) via stainless steel transfer lines, with are then nitrogen purged for 10 minutes. The reaction mixture is transferred into the reactor via nitrogen pressurization (10 psig, ~68.9 kPa), and the reactor purged with ethylene (3×100 psig, ~689 kPa; 1 min stirring). The reactor is then pressurized with ethylene (200 psig, ~1,379 kPa) and stirred (450 rpm) until saturated (stable pressure), sealed, and heated to and held at 40° C. with stirring (350 rpm). After a 10-minute stabilization period, the reactor is heated to 100° C. (2° C./min ramp to prevent temperature overshoot), and held at that temperature for 140 minutes. The reactor is then cooled to room temperature (external fan), depressurized, and then purged three times with nitrogen (100 psig, ~689 kPa). The reactor is then connected to a nitrogen flow (10 psig, ~68.9 kPa), which is used to transfer the reaction mixture to a stainless-steel sample cylinder. The cylinder is sealed and transported into an inerted glovebox, and the contents transferred to a glass vial. A reference sample of the reaction mixture (1 g aliquot) is taken into a glass vial, diluted with Solvent (S-1) (4 g), and analyzed by gas chromatography to evaluate conversion of Hydridosilane (A-1) and yield of the organosilicon compound, with the following results: conversion of dimethylchlorosilane=73% (23% of starting dimethylchlorosilane left unreacted); yield of ethyldimethylchlorosilane=64%; vinyldimethylchlorosilane as the major side product (13%).

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, it is to be understood that the terms "right angle", "orthogonal", "perpendicular", and "parallel" are generally employed herein in a relative and not an absolute sense. Further, it will be appreciated that the terms "substantially", "about", "essentially", etc. indicate minor deviations of the property being modified. Such deviation may be of from 0-10%, alternatively of from 0-5%, alternatively of from 0-3% of a particular property.

The invention claimed is:

1. A method of preparing an organosilicon compound, said method comprising:
reacting via silylation (A) a hydridochlorosilane compound and (B) ethylene in the presence of (C) a catalyst comprising a Ru$_3$(CO)$_{12}$ complex and a phosphorus ligand, thereby preparing the organosilicon compound.

2. The method of claim 1 the method further comprises preparing the catalyst (C).

3. The method of claim 1, wherein: (i) the phosphorous ligand has the general formula R$_1^2$PR$^2$, where each R$^1$ is an independently selected from a group consisting of substituted or unsubstituted aryl group, aralkyl group, or cycloalkyl group, and R$^2$ is R$^1$ or an alkaryl group; (ii) the phosphorous ligand comprises a Tolman Electronic Parameter of from 2,060 to 2,090 cm$^{-1}$; (iii) the phosphorous ligand comprises a Tolman Cone Angle of from 115° to 185°; or (iv) any combination of (i)-(iii).

4. The method of claim 1, further comprising preparing the catalyst (C), and wherein preparing the catalyst (C) comprises combining Ru$_3$(CO)$_{12}$ and a phosphorous ligand precursor compound to give a Ru (0)-phosphorous complex, thereby preparing the catalyst (C).

5. The method of claim 1, wherein the hydridochlorosilane compound (A) has the general formula HSiCl$_x$R$_{3-x}$, where subscript x is 1, 2, or 3 and each R is an independently unsubstituted hydrocarbyl group having from 1 to 18 carbon atoms.

6. The method of claim 5, wherein subscript x is 1 or 2 such that the hydridochlorosilane compound (A) is further defined as an organohydridochlorosilane compound.

7. The method of claim 5, wherein the silylation is further defined as dehydrogenative coupling of the hydridochlorosilane compound (A) and the ethylene (B) such that the organosilicon compound is prepared as a vinylchlorosilane compound, and wherein the dehydrogenative coupling is carried out at a stoichiometric ratio of hydridochlorosilane compound (A) to ethylene (B) of at least 1:2 (A):(B).

8. The method of claim 7, wherein subscript x is 2 such that the hydridochlorosilane compound (A) is further defined as an organohydridodichlorosilane having the formula HSiCl$_2$R and the vinylchlorosilane compound is further defined as an organovinyldichlorosilane having the formula (H$_2$CCH)SiCl$_2$R, where R is as defined above;
and wherein the Ru (0) complex of the catalyst (C) comprises an organophosphite ligand.

9. The method of claim 8, wherein the organophosphite ligand comprises a substituted or unsubstituted triarylphosphite.

10. The method of claim 7, wherein x is 1 such that the hydridochlorosilane compound (A) is further defined as a diorganohydridochlorosilane having the formula HSiClR2 and the vinylchlorosilane compound is further defined as a diorganovinylchlorosilane having the formula (H$_2$CCH)SiClR$_2$, where R is as defined above; and wherein the Ru (0) complex of catalyst (C) comprises an organophosphine ligand.

11. The method of claim 10, wherein the organophosphine ligand is selected from a group consisting of substituted or unsubstituted triarylphosphines, tricycloalkylphosphines, bis (diarylphosphino) alkanes, and bis (dicycloalkylphosphino) alkanes.

12. The method of claim 7, wherein dehydrogenative coupling of components (A) and (B) is carried out in the presence of (D) an olefin compound having an unsaturated aliphatic group.

13. The method of claim 12, wherein the olefin compound (D) comprises a bridged cyclic hydrocarbon.

14. The method of claim 5, wherein the silylation is further defined as hydrosilylation of the hydridochlorosilane compound (A) and the ethylene (B) such that the organosilicon compound is prepared as an ethylchlorosilane compound, and wherein the hydrosilylation is carried out at a stoichiometric ratio of hydridochlorosilane compound (A) to ethylene (B) of less than 1:2 (A): (B).

15. The method of claim 1, wherein the organosilicon compound is prepared in a reaction product, and wherein the method further comprises:

(I) isolating the catalyst (C) or a derivative thereof from the reaction product; and
(II) using the isolated catalyst (C) or derivative thereof to catalyze a further silylation reaction.

16. The method of claim 15, wherein: (i) the silylation reaction is further defined as a dehydrogenative coupling and the further silylation reaction is further defined as a hydrosilylation; or (ii) the silylation reaction is further defined as a hydrosilylation and the further silylation reaction is further defined as a dehydrogenative coupling.

17. The method of claim 1, wherein silylation is carried out: (i) at an elevated temperature of from 60 to 200° C.; (ii) at a pressure of from atmospheric pressure to 110 bar; (iii) in the presence of a solvent; (iv) with a concentration of the catalyst (C) in an amount of from 0.0001 to 5 wt. % based on the total amount of component (A) utilized; or (v) any combination of (i) to (iv).

18. The method of claim 1, having: (i) a conversion of the hydridochlorosilane compound (A) of at least 85%; (ii) a yield of the organosilicon compound of at least 75%; or (iii) both (i) and (ii).

* * * * *